United States Patent
Yu et al.

(10) Patent No.: US 11,520,497 B2
(45) Date of Patent: Dec. 6, 2022

(54) PEAK POWER MANAGEMENT IN A MEMORY DEVICE

(71) Applicant: Micron Technology, Inc., Boise, ID (US)

(72) Inventors: Liang Yu, Boise, ID (US); Jonathan Scott Parry, Boise, ID (US); Luigi Pilolli, L'Aquila (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/110,103

(22) Filed: Dec. 2, 2020

(65) Prior Publication Data
US 2022/0171546 A1 Jun. 2, 2022

(51) Int. Cl.
*G06F 3/06* (2006.01)
*G06F 12/0802* (2016.01)

(52) U.S. Cl.
CPC .......... *G06F 3/0625* (2013.01); *G06F 3/0659* (2013.01); *G06F 3/0679* (2013.01); *G06F 12/0802* (2013.01); *G06F 2212/60* (2013.01)

(58) Field of Classification Search
CPC .................................................. G06F 3/0625
See application file for complete search history.

(56) References Cited

U.S. PATENT DOCUMENTS

| | | |
|---|---|---|
| 10,712,955 B2 | 7/2020 | Jeon et al. |
| 2004/0168043 A1* | 8/2004 | Keller ............... G06F 9/384 |
| | | 712/E9.055 |
| 2007/0113058 A1* | 5/2007 | Tran ............... G06F 9/3887 |
| | | 712/E9.058 |
| 2014/0195734 A1 | 7/2014 | Ha et al. |
| 2020/0312412 A1 | 10/2020 | Tanaka |
| 2021/0217482 A1 | 7/2021 | Choi et al. |
| 2021/0248032 A1 | 8/2021 | Kang |
| 2022/0172767 A1 | 6/2022 | Yu et al. |

FOREIGN PATENT DOCUMENTS

| | | |
|---|---|---|
| CN | 114579498 A | 6/2022 |
| CN | 114582409 A | 6/2022 |

OTHER PUBLICATIONS

"Yu, Liang, et al., Power Management Across Multiple Packages of Memory Dies, U.S. Appl. No. 17/110,128, filed Dec. 2, 2020, 51 pgs.", 51 pgs.

* cited by examiner

*Primary Examiner* — Jae U Yu
(74) *Attorney, Agent, or Firm* — Schwegman Lundberg & Woessner, P.A.

(57) ABSTRACT

A variety of applications can include a memory device having a memory die designed to control a power budget for a cache and a memory array of the memory die. A first flag received from a data path identifies a start of a cache operation on the data and a second flag from the data path identifies an end of the cache operation. A controller for peak power management can be implemented to control the power budget based on determination of usage of current associated with the cache from the first and second flags. In various embodiments, the controller can be operable to feedback a signal to a memory controller external to the memory die to adjust an operating speed of an interface from the memory controller to the memory die. Additional devices, systems, and methods are discussed.

25 Claims, 11 Drawing Sheets

PEAK POWER MANAGEMENT IN A MEMORY DEVICE

FIELD OF THE DISCLOSURE

Embodiments of the disclosure relate generally to memory devices and operation of memory devices and, more specifically, to managing power budgets of memory devices.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), or three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a data line.

In some NAND memory dies, peak power management (PPM) logic is implemented to control peak power consumption in the memory die. Existing PPM designs focus on memory array operations, such as erase, program array, read array, or independent wordline reads (iWL). These designs do not consider current in cache operations of a cache used with the memory array operations in a data path to or from the memory array, such as, for example, read and write data pattern to a cache. In conventional practice, enough budget for cache operations is simply reserved, which reduces efficiency of NAND memory array operations. For example, in a Universal Flash Storage (UFS) device implementation, 20%-50% of a 800 mA system budget may be allocated to NAND cache operations without consideration of actual current use of the cache operations.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
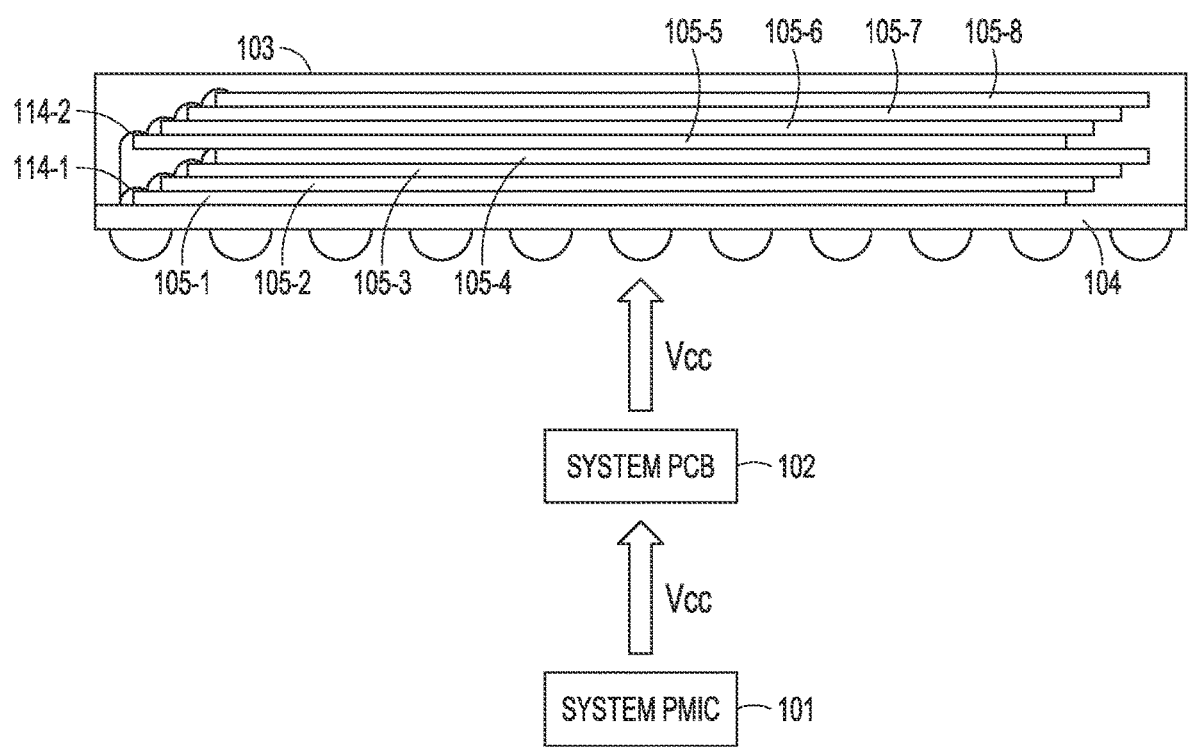
FIG. 1 illustrates an example relationship of a memory device package with respect to a system power management integrated circuit that provides supply voltage to the memory device package via a system printed circuit board, in accordance with various embodiments.

The following detailed description refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Both NOR and NAND flash architecture semiconductor memory arrays of flash memory devices are accessed through decoders that activate specific memory cells by selecting an access line (WL) coupled to gates of specific memory cells. In a NOR architecture semiconductor memory array, once activated, the selected memory cells place their data values on data lines, causing different currents to flow depending on the state at which a particular cell is programmed. In a NAND architecture semiconductor memory array, a relatively high bias voltage is applied to a drain-side select gate (SGD) line. Access lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows in the line between the source line and the data line through each series-coupled group, restricted only by the selected memory cells of each group, placing current encoded data values of selected memory cells on the data lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC has been referred to as a memory cell that can store two bits of data per cell (e.g., one of four programmed states). MLC is used herein in its broader context, to refer to any memory cell(s) that can store more than one bit of data per cell (i.e., that can represent more than two programmed states). Herein, a memory cell that can store two bits of data per cell (e.g., one of four programmed states) can be referred to as a duo-level cell (DLC). A triple-level cell (TLC) can refer to a memory cell that can store three bits of data per cell (e.g., one of eight programmed states). A quad-level cell (QLC) can store four bits of data per cell, and a penta-level cell (PLC) can store 5 bits of data per cell.

In various embodiments, the PPM logic of a memory die, such as a NAND memory die, can be structured to account for and manage current usage of cache operations as well as current usage of memory operations. Accounting for the current usage of cache operations can provide enhanced operation of the memory die, because part of the cache operations that use current along a data path are supplied by supply voltage Vcc, which also supplies current to memory array operations. The current budget associated with a common supply, which can be allocated in terms of a peak budget, is shared by the cache operations and the memory array operations.

Cache operations are not negligible when data path speed increases to 1200 MT/s, 1600 MT/s, or even higher. For example, write data cache current with four data channels (ICC4 W) can be 92 mA at 1600 MT/s, while it can be 52 mA at 800 MT/s. Read data cache current with four data channels (ICC4R) can be 152 mA at 1600 MT/s, while it can be 82 mA with 800 MT/s. A clear trend is towards increased supply current (ICC) usage in cache operations. For example, with the above current values with respect to a UFS system having a peak power budget of 800 mA in mobile allocations with respect to a Vcc power rail of the UFS system, the ICC cache current approaches 20% of the peak power budget.

In a conventional NAND design, there is a trend to move data path from a Vccq supply to Vcc supply by a power rail switch to work around reliability issues and to obtain fast transistor performance without expensive transistor improvements. Vcc is the supply voltage for the core of the memory die and Vccq is a supply voltage for input and output (I/O) of the memory die. This trend may stress the Vcc power rail peak power budget as well, which may result in extra ICCQ4 W and ICCQ4R being moved into the ICC budget. For example, ICCQ4 W with four channels may be raised to 164 mA at 1600 MT/s, while ICCQ4R with four channels may be raised to 360 mA at 1600 MT/s. Again, assuming a 800 mA peak power budget for a UFS system, this indicates a trend to extra cache current that is about 45% of the UFS system peak power budget.

Conventional system designs reserve current for cache operations from a total peak power budget. For example, 100 mA may be reserved from all budgets for a four channel device, with only a total budget of 100 mA assigned to a PPM manager in a NAND memory die. This approach still works in a 800 MT/s four channel memory, as 100 mA is only 12.5% of a total budget of 800 mA, for example, such that the PPM is still efficient with 700 mA budget for four to eight active memory dies running. In another case, the overall cache current could be 50% of the system peak power budget. However, the PPM can have issues if the cache current is 50% of the system peak power budget. The period for a cache current operations is relatively shorter, for example, a 10 µs level depending on the speed, than most of array operations, which can be tens or hundreds of microseconds. It makes PPM inefficient if a system design reserves 50% cache current budget, while the associated cache operation time is only around 10 µs. By reserving for the cache current budget, the PPM will waste a considerable amount of budget because of the short cache operation time.

In various embodiments, an approach to managing power budgets can include conducting procedures to manage cache operations in the PPM logic of a memory die in conjunction with managing operations of the memory array of the memory die. Procedures can include taking into account current in a data path for write or read cache operations by PPM logic to increase the PPM efficiency in a memory die. In various embodiments, a PPM manager can be structured to monitor key circuit blocks or a command state machine to detect cache write operation start and finish in a data path for writing. Additionally, the PPM manager can be structured to monitor key circuit blocks or the command state machine to detect a cache read operation start and finish for reading. Key signals can be monitored by, detected by, or sent to the PPM manager of a memory die, and used to participate in budget reservations and PPM strategy for the memory die. For memory dies arranged together in a PPM group, the memory dies in the PPM group can efficiently use all of the peak power budget.

FIG. 1 illustrates an embodiment of an example relationship of a memory device package 103 with respect to a system power management integrated circuit (PMIC) 101 that provides Vcc to the memory device package 103 via a system printed circuit board (PCB) 102. The memory device package 103 includes memory dies 105-1, 105-2, 105-3, 105-4, 105-5, 105-6, 105-7, and 105-8 located on a substrate 104 that can act as in internal PCB in the package. Though eight memory dies are shown, a memory device package can include more or less than eight memory dies. The memory dies 105-1, 105-2, 105-3, 105-4, 105-5, 105-6, 105-7, and 105-8 can be arranged as two levels or sets of memory dies. A first set can include memory dies 105-1, 105-2, 105-3, and 105-4 coupled to the substrate 104 by wire bonds such as wire bond 114-1, with the substrate 104 providing electrical conductivity to the system PCB 102. Wire bonds such as the wire bond 114-1 can provide a channel for operation of the memory dies 105-1, 105-2, 105-3, and 105-4. A second set can include memory dies 105-5, 105-6, 105-7, and 105-8 coupled to the substrate 104 by wire bonds such as wire bond 114-2, with the substrate 104 providing electrical conductivity to the system PCB 102. Wire bonds such as the wire bond 114-2 can provide another channel for operation of the memory dies 105-5, 105-6, 105-7, and 105-8. In the example of FIG. 1, the memory device package of memory dies has two channels that can be operated in parallel. In other examples, the stacked memory devices may be interconnected through through-substrate-vias ("TSVs"); with selected dies in the stack connected to operate as separate channels. In some such examples, the stacked die TSVs can connect with contacts on or within substrate 104, or with a logic interface die (or assembly) between substrate 104 and the stacked die.

Vcc is supplied to the memory dies 105-1, 105-2, 105-3, 105-4, 105-5, 105-6, 105-7, and 105-8. Current for cache operations and memory operations on each of the memory dies 105-1, 105-2, 105-3, 105-4, 105-5, 105-6, 105-7, and 105-8 is provided by Vcc external pads and Vcc wire bonds, which are sources of resistance. As a result of such resistances, there can be voltage drops between cascades of the memory dies, which can affect the current available for cache and memory array operations of the memory dies at different cascade levels. The management of current budgets among the memory dies 105-1, 105-2, 105-3, 1054, 105-5, 105-6, 105-7, and 105-8 can be handled by PPM logic management on each memory die to share current budget among the memory dies.

Figure 2:
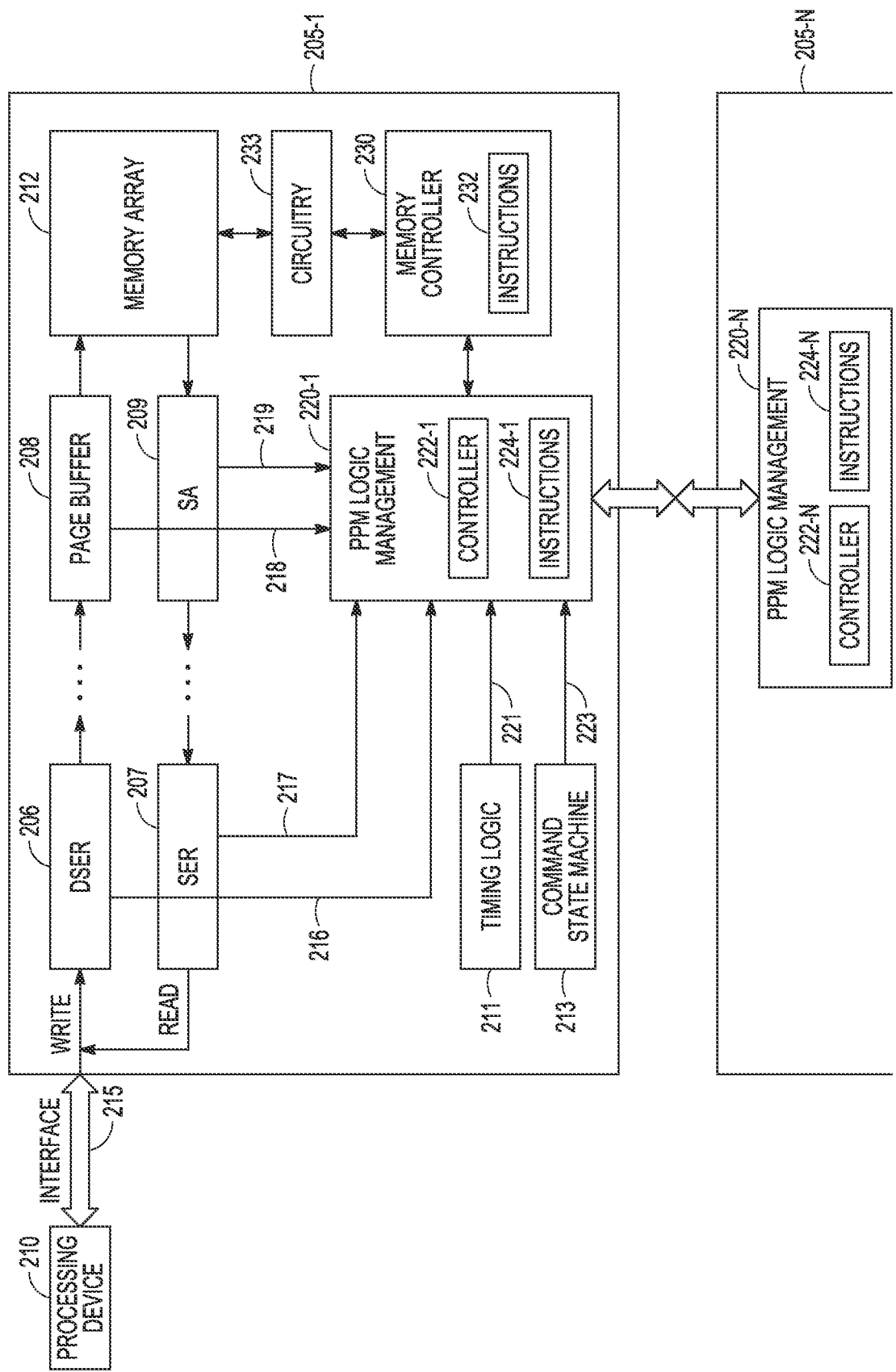
FIG. 2 illustrates an example memory die coupled to a processing device via an interface, in accordance with various embodiments.

FIG. 2 illustrates an embodiment of an example memory die 205-1 coupled to a processing device 210 via an interface 215. Memory die 205-1 is also coupled to another memory die 205-N. Though not shown, memory die 205-1 can be coupled to other memory dies. These memory dies can be NAND memory dies, with interface 215 being an Open NAND Flash Interface (ONFI). The memory die 205-1, memory die 205-N. and other memory dies coupled to the memory die 205-1 can be arranged in a memory device package such as memory device package 103 of FIG. 1. The memory device package is not shown in FIG. 2 for ease of discussion of memory die 205-1. The processing device 210 can be external to the memory device package that contains the memory die 205-1. Processing device 210 can include processing circuitry having one or more processors, where the processing device 210 is configured to perform operations to write to and read from the memory die 205-1 and other memory die associated with the memory die 205-1. The processing device 210 can be oriented for user devices to interact with the memory die 205-1 and other memory die associated with the memory die 205-1.

The memory die 205-1 can include, among other components, deserializer circuitry 206, a page buffer 208, a memory array 212, a memory controller 230 with associated with instructions 232, circuitry 233 coupling the memory array 212 to the memory controller 233, a sense amplifier 209, serializer circuitry 207, timing logic 211, PPM logic management 220-1 having a controller 222-1 with associated instructions 224-1. The circuitry 233 can be implemented with CMOS (complementary metal oxide semiconductor) circuitry or its equivalent. Other components of the memory die 205-1 are not shown for ease of discussion of components and functions to control current budget for cache operations and memory array operations of the memory die 205-1. The components and functions to control the control budget can be implemented with respect to the PPM logic management 220-1.

In addition to the controller 222-1 and instructions 224-1, the PPM logic management 220-1 can include logic circuits and registers. The logic circuits and registers can be used in receiving signals from other components of the memory die 205-1. The controller 222-1 can include processing circuitry, including one or more processors, and can be configured to perform peak power management operations for the memory die 205-1 by executing instructions 224-1. Execution operations of the PPM logic management 220-1 can include communicating current budgets with other PPM logic management components of other memory die located in a memory device package with memory die 205-1. For example, memory die 205-N can include a controller 222-N and instructions 224-N that can operate similar to controller 222-1 and instructions 224-1 of memory die 205-1. The controller 222-1 can be a dedicated controller for the PPM logic management 220-1. Alternatively, the controller 222-1 can be the controller for the memory die 205-1 that handles operations of the memory array 212 with the instructions 224-1 dedicated to conduct peak power management for the memory die 205-1. The PPM logic management 220-1 can be a dedicated state machine that handles all PPM related items.

For a write operation to the memory array 212 of the memory die 205-1, data received at the deserializer circuitry 206 as serial data in from the interface 215 is output as parallel data on a data path to the page buffer 208 for programming the memory array 212. Additional circuitry can be located along the data path from the deserializer circuitry 206 to the page buffer 208. The memory array 212 is relatively slow to program, compared to propagation speed in the memory die 205-1. In addition, with the memory array 212 arranged as a memory array with MLCs, more operations are involved with programming the memory array 212. To address the complexity of programming data into the memory array 212, data is received and held in the page buffer 208 as other data is loaded into the memory array 212. The page buffer 208 provides a cache to allow loading in additional data ahead of the data transfer for the next programming of data into the memory array 212 to enhance performance. Associated with the cache operation of the page buffer 208 is consumption of current using power provided to the memory die 205-1 using Vcc.

For a read operation from the memory array 212 of the memory die 205-1, data is provided to the sense amplifier 209 from the memory array 212. Data is held in the sense amplifier 209 as data is loaded from the memory array 212. The sense amplifier 209 provides a cache to allow collecting of data ahead of data transfer from the memory die 205-1. Data loaded into the sense amplifier 209 is sent to the serializer circuitry 207, which can serialize the data for output to the interface 215. Additional circuitry can be located along the data path from the sense amplifier 209 to the serializer circuitry 206. Associated with the cache operation of the sense amplifier 209 is consumption of current using power provided to the memory die 205-1.

For write and read cache operations, a command state machine or circuits along a data path between the interface 215 and the memory array 212 can provide signals to be monitored by the PPM logic management 220-1. The use of the signals with respect to write and read cache operations in the memory die 205-1 can provide a mechanism to pass information of current usage in the write and read cache operations to the PPM logic management 220-1. The PPM logic management 220-1 can update parameters that it uses and update the status of cache operations and memory array operations with respect to current usage. The PPM logic management 220-1 can be implemented as logic management for predictive peak power management (pPPM). Digital pPPM is a mechanism that is used to track peak power consumption by controller/firmware/logic and to provide emphasis on efficiency of the controller/firmware/logic. The use of pPPM features can be implemented with multiple-die configurations with various operations running on the multiple dies simultaneously. A pPPM manager can communicate within a memory die and halt the operation or go to low peak power mode if the total peak power is more than expected. The PPM logic management 220-1 can communicate with other memory dies, such as memory die 205-N, to share information regarding current budget for cache and memory array operations. Based on updating the current budget using the signals, the PPM logic management 220-1 can provide feedback to the memory controller 230 to control write and read operations within the memory array 212.

For a write cache operation, for example, the deserializer circuitry 206 can be used to identify a start of the write cache operation, and the page buffer 208 can be used to identify a stop of the write cache operation. Identification of a first specified event in a timing pattern input to the deserializer circuitry 206 can be used to generate a signal from the deserializer circuitry 206 to the PPM logic management 220-1 along a path 216. This signal provides a first flag received from the data path identifying the start of the write cache operation on the data of the write operation. Identification of a second specified event in the timing pattern input to the page buffer 208 can be used to generate a signal from the page buffer 208 to the PPM logic management 220-1 along a path 218. This signal provides a second flag received from the data path identifying the end of the write cache operation on the data of the write operation. Comparison circuits can be used to identify the occurrence of the first and second specified events. The timing logic 211 of the memory die 205-1 can be used as a monitor of the cache operation by providing a signal along path 221 to the PPM logic management 220-1. The timing logic 211 can be used to identify an interface timing mode for data-in in the write cache operation. Alternatively, a command state machine 213 can be used as a monitor of the cache operation by providing a signal along path 223 to the PPM logic management 220-1. The determination of start and stop cache operations for write operations are not limited by the use of the deserializer circuitry 206 and the page buffer 208. Other circuits in the data path form the interface 215 to the memory array 212 can be used to participate in the PPM of the memory die 205-1.

For a read cache operation, for example, the sense amplifier 209 can be used to identify a start of the read cache operation, and the serializer circuitry 207 can be used to identify a stop of the read cache operation. Identification of a first specified event in a timing pattern to the memory die 205-1 can be used to generate a signal from the sense amplifier 209 to the PPM logic management 220-1 along a path 219. This signal provides a first flag received from the data path identifying the start of the read cache operation on the data of the read operation. Identification of a second specified event in the timing pattern input to the memory die 205-1 can be used to generate a signal from the serializer circuitry 207 to the PPM logic management 220-1 along a path 217. This signal provides a second flag received from the data path identifying the end of the read cache operation on the data of the read operation. Comparison circuits can be used to identify the occurrence of the first and second specified events. The timing logic 211 of the memory die 205-1 can be used as a monitor of the cache operation by providing a signal along path 221 to the PPM logic management 220-1. The timing logic 211 can be used to identify an interface timing mode for data-out in the read cache operation. Alternatively, a command state machine 213 can be used as a monitor of the cache operation by providing a signal along path 223 to the PPM logic management 220-1. The determination of start and stop cache operations for read operations are not limited by the use of the sense amplifier 209 and the serializer circuitry 207. Other circuits in the data path from memory array 212 to the interface 215 can be used to participate in the PPM of the memory die 205-1.

The PPM logic management 220-1 uses the flags for the write cache operation and the read cache operation as a determination that current is being used in the respective cache operation. The amount of current during the identified cache operation used can be taken to be a fixed amount stored or hardcoded in the PPM logic management 220-1. Alternatively, a lookup table accessed by the PPM logic management 220-1 can be used in which the lookup table has current values based on programmed timing modes or speeds of the data path for the respective write or read cache operation. At the time of the generation of the flags for the cache operation, the value in the lookup table can be selected using the signal from the timing logic 211.

In addition to receiving flags from data paths in cache operations associated with operating the memory array 212, the PPM logic management 220-1 receives information regarding memory array operations from the memory controller 230. Using the received flags and the received information from the memory controller 230, the PPM logic management 220-1 can monitor operations associated with the memory array 212 and the page buffer 208 in write operations and associated with the memory array 212 and the sense amplifier 209 in read operations and calculate total peak power used by the memory array and the respective cache. This total peak power can be calculated in terms of current. Activity associated with a separate reserved current budget for caches by an external user device to the memory device can be avoided.

A cache operation and a memory array operation can be operating at the same time. Since the memory die 205-1 has a constant Vcc provided during operation of the memory die 205-1, the peak current is a parameter to be managed according to a budget. During programming of the memory array 212, pulses are used, which is accompanied by periods of relatively high current and periods of relatively low current. The PPM logic management 220-1 on memory die 205-1, taking into account the total current of cache operations and memory array operations, can use high current peak time and low current peak time to stagger when data is allowed to move in the memory array 212. The PPM logic management 220-1 communicates with the memory controller 230 to control the staggering or pausing in the movement of data in the memory array 212.

The memory controller 230 can include processing circuitry, including one or more processors, and can be configured to perform operations on the memory array 212 by executing instructions 232. The memory controller 230 with the instructions 232 can be structured as firmware for the memory die 205-1 to control functions of the memory array 212. The memory controller 230 can be a dedicated programmable controller to operate as firmware or may be a main memory controller for the memory die 205-1 to execute operations according to instructions 232. Firmware code in the programmable memory controller 230, used to implement array mad and program operations, makes a request to the PPM logic management state machine before entering "high current peak" operations. The PPM logic management 220 acknowledges the operation or puts it on hold depending on the overall system current budget, which can include the current budget of other memory dies arranged with the memory die 205-1 in a memory device package. In other examples, at least some portion of the instructions executed by memory controller 230 may be stored in other memory structures and loaded, for example, into local memory of the memory controller 230 for execution. The memory controller 230 waits until it receives a signal to proceed from the PPM logic management 220-1 before executing code in the instructions 232 that cause ICC peaks in memory array operation of the memory die 205-1.

Figure 3:
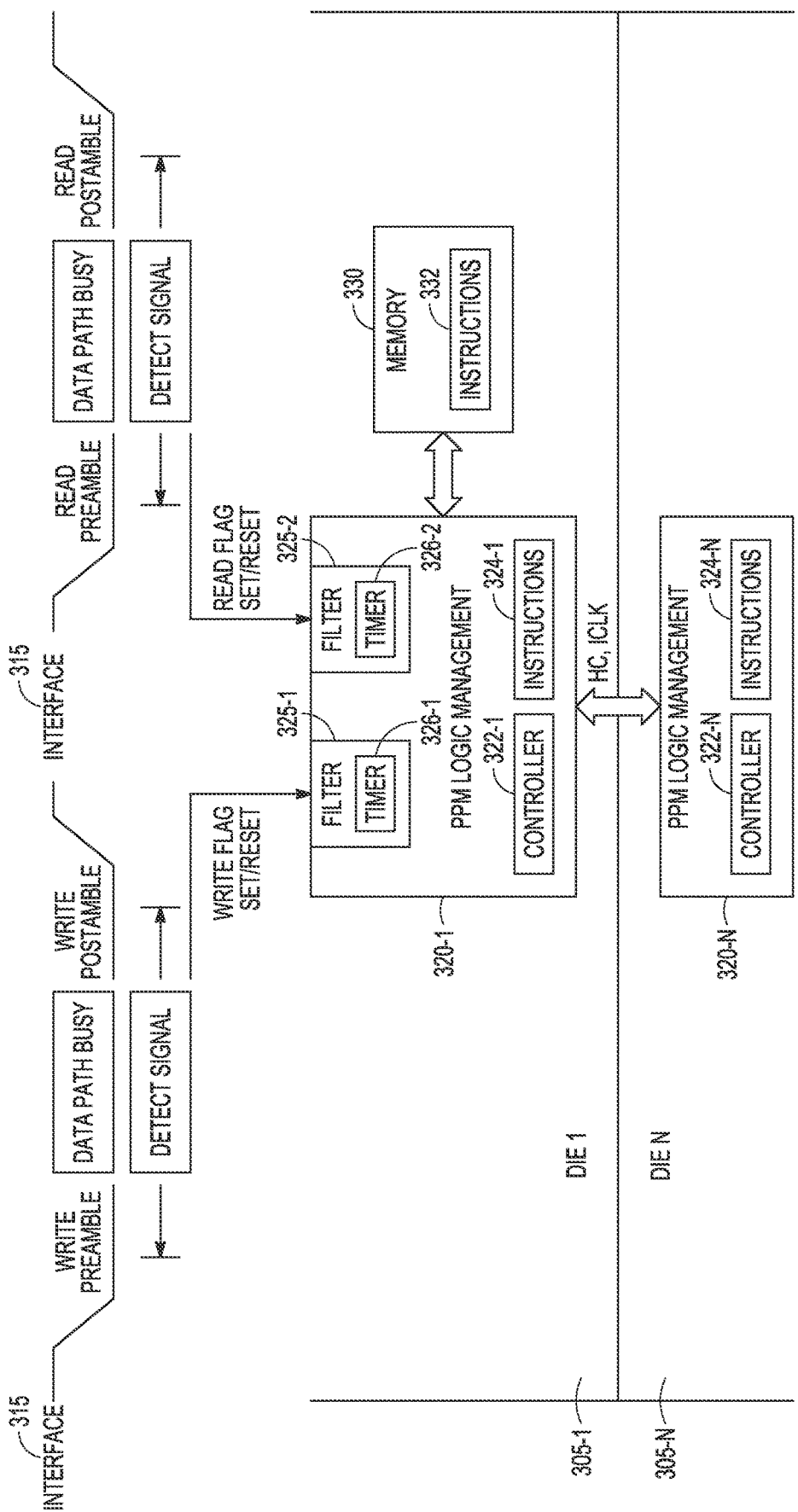
FIG. 3 is an example functional representation of peak power management with respect to a current budget that takes into account a current budget of caches associated with memory array operations along with the current budget of the memory operations of a memory die, in accordance with various embodiments.

FIG. 3 is an embodiment of an example functional representation of peak power management with respect to a current budget that takes into account current budget of caches associated with memory array operations along with the current budget of the memory array operations of a memory die such as memory die 305-1. The memory die 305-1 can include a PPM logic management 320-1 having a controller 322-1 and associated instructions 324-1. The memory die 305-1 can be structured identical or similar to the memory die 205-1 FIG. 2. FIG. 3 illustrates operation of two caches, where one cache is used with a write operation, and the other cache is used with a read operation.

In a write operation, a timing signal is received from an interface 315, where the timing signal has a write preamble and a write postamble in which a data path is busy between the beginning of the write preamble and the end of the write postamble. This indicates a period of an active write cache operation. The beginning of the write preamble can be used to provide a detection signal to send a write flag to identify the start of a write cache operation to set monitoring of the cache operation. The end of the write postamble can be used to send a write flag to identify the end of the write cache operation to reset the monitoring of the cache operation for the next write flag to set monitoring of the cache operation.

In a read operation, a timing signal is sent to the interface 315, where the timing signal has a read preamble and a read postamble in which a data path is busy between the beginning of the read preamble and the end of the read postamble. This indicates a period of an active read cache operation. The beginning of the read preamble can be used to provide a detection signal to send a read flag to identify the start of a read cache operation to set monitoring of the cache operation. The end of the read postamble can be used to send a read flag to identify the end of the read cache operation to reset the monitoring of the cache operation for the next read flag to set monitoring of the cache operation.

The PPM logic management 320-1 can include a filter 325-1 to receive a write flag for a set operation and a write flag for a reset operation, as they are generated from detecting appropriate signals on the data path for write operations. The PPM logic management 320-1 can include a filter 325-2 to receive a read flag for a set operation and a read flag for a reset operation, as they are generated from detecting appropriate signals on the data path for read operations. The filters 325-1 and 325-2 can be implemented as a single filter with inputs from the data path for a write operation and from the data path for a read operation. The filters 325-1 and 325-2 can use the received flags to avoid frequent cache operation power budget release that affects PPM budget allocation efficiency. The filters 325-1 and 325-2 can have timers 326-1 and 326-2, respectively, set such that the previous cache operation budget can only be released when the timer hits its filter time and there is no new cache operation occurring. The filter time can be, but is not limited to, about 10 μs as example.

In addition to receiving flags from data paths in cache operations associated with operating a memory array of memory die 305-1, the PPM logic management 320-1 receives information regarding memory array operations from a memory controller 330. The memory controller 330 can include processing circuitry, including one or more processors, and can be configured to perform operations on the memory array of memory die 305-1 by executing instructions 332. The memory controller 330 with the instructions 332 can be structured as firmware for the memory die 305-1 to control functions of the memory array of memory die 305-1. The memory controller 330 can be a dedicated programmable controller to operate as firmware or may be a main memory controller for the memory die 305-1 to execute operations according to instructions 332. Using the received flags and the received information from the memory controller 330, the PPM logic management 320-1 can monitor operations associated with the memory array and caches of the memory die 305-1 in write and read operations associated with the memory array and calculate total peak power used by the memory array and the respective cache. This total peak power can be calculated in terms of current.

The memory die 305-1 can operate with a number, N, of other memory dies in a memory device package to share a total ICC budget provided to the memory dies. These other memory dies, such as memory die 305-N, can be structured identical or similar to the memory die 305-1. The memory die 305-N can include a controller 322-N and associated instructions 324-N and can be operable to perform functions on memory die 305-N identical or similar to the functions performed by memory die 305-1. The memory dies sharing a total ICC budget form a PPM group. The PPM group operates with each of the memory dies 305-1 . . . 305-N coupled to a communication bus, HC, and an internal clock line, ICLK, in the memory device package. These memory dies can be NAND memory dies with interface 315 being an interface structured according to ONFI specifications.

The controllers 322-1 . . . 322-N of the PPM logic managements 320-1 . . . 320-N can execute instructions 324-1 . . . 324-N, respectively, to perform PPM operations including features related to a total ICC budget of the PPM group. The PPM feature can include avoidance of exceeding the total ICC budget in multiple memory die configurations. Each memory die 305-j of the memory dies 305-1 . . . 305-N, 1≤j≤N, can communicate to other memory dies within the same package, via its PPM logic managements 320-j coupled to the HC, the ICC value being consumed within the memory die 305-j. A number of bits such as, but not limited to, serial bits can be used to represent the ICC consumed. For example, three serial bits can be used to represent the ICC. The number of bits can be more or less than three bits. Each of the memory dies 305-1 . . . 305-N, via its respective PPM logic management, can store the ICC value communicated by the other memory die in order to track the total ICC at the system level defined by the multiple memory dies.

Communication among the memory dies 305-1 . . . 305-N of the PPM group can use a round-robin token protocol communication. The use of ICLK in the communication process can be driven by one of the memory dies 305-1 . . . 305-N set as a manager memory device. The ICLK can be driven by the manager memory die to sync all the memory dies of the PPM group. The setting of one of the memory dies 305-1 . . . 305-N as a manager memory device can be made by a processing device external to the memory dies 305-1 . . . 305-N. Each one of the memory dies 305-1 ... 305-N has its own PPM logic management 320-1 ... 320-N, respectively, that contains the ICC values of all the memory dies of the PPM group. In response to one memory die of the dies 305-1 ... 305-N determining that the ICC budget available is not enough to perform a cache or a memory operation within the full-peak ICC budget, the PPM logic management of the one memory die can pause the associated cache or a memory operation. Alternatively, the PPM logic management of the one memory die can allow performance of a reduced ICC phase, if a reduced ICC budget is available. All memory dies 305-1 ... 305-N can perform such ICC budget operations.

Figure 4:
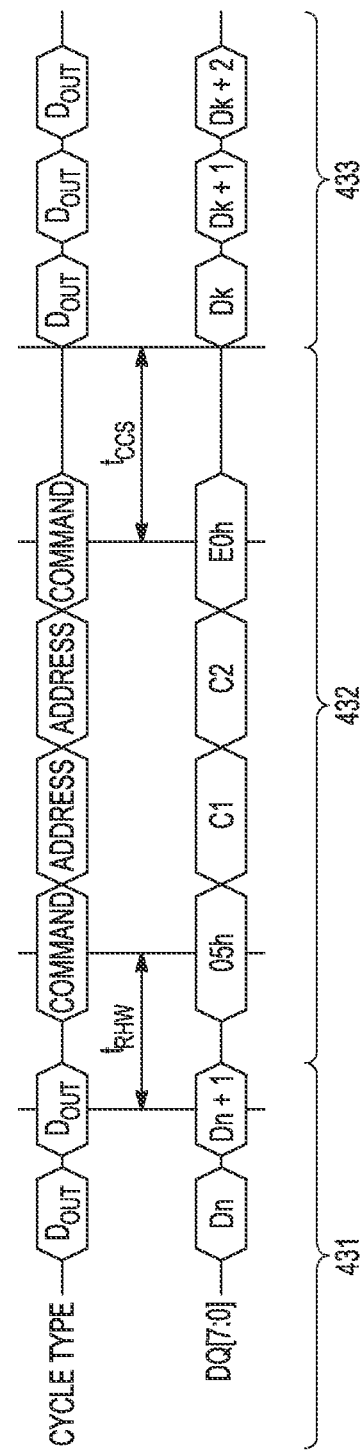
FIG. 4 illustrates an example use of a delay filter to maintain a current budget of a memory die, in accordance with various embodiments.

FIG. 4 illustrates an embodiment of an example use of a delay filter to maintain a current budget of a memory die. The filters 325-1 and 325-2 of FIG. 3 can be used to implement the delay filter. The delay filter can be used to avoid frequent release of the power budget of a cache operation that affects PPM budget allocation efficiency. With the delay filter having a timer set to some value, such as but not limited to 10 µs, a previous cache operation budget can be controlled such that it is only released when the timer reaches the set time and there is no new cache operation occurring. Section 431 for the timing pattern shown is for an existing PPM budget assigned for cache operation. In section 432, the PPM logic management can reserve budget for the length of the time set by its filter timer. Section 433 shows a cache operation resuming according to its reserved budget.

In a data transfer, the transfer can be paused and started a number of times, for example, by the host providing the data to the memory die stopping and then starting again. The filter can provide an apparent time delay that acts as a mechanism to appear that the data is still being transferred when it may, in fact, be paused. The filter acts as a glitch filter, which filters glitches in the data transfer that smooths out pauses so that the current budget can be more smoothly controlled. From the data out of section 431 of FIG. 4 to the data out of section 433, the filter adds some apparent time. In section 432, there is a pause or a gap in the time periods $t_{RHW}$ and $t_{CCS}$. Because during this time the physical transfer is stopped, it is desired to reserve this budget, which can be accomplished by a glitch filter. Reserving this budget provides a mechanism so that other memory die do not take this budget.

To achieve better quality of service (QOS), the read/write cache operations can be given highest priority, including higher priority than NAND array operations. Since data cache read/write commands are based on nano seconds level, even though the operations take 10 µs level. QOS could not simply rely on traditional budget applications, which are in microseconds. In various embodiments, the PPM logic management can internally reserve a certain budget for cache operations. For example, to have one channel ICC4R budget, which can be a worst case and larger than ICC4 W, current of (360 mA+82 mA)/4=110.5 mA can be reserved for next cache operations, so that the NAND memory die could immediately respond to the request without blowing out the budget. Once one cache operation occurs and uses the reserved budget, the PPM logic management can continue to reserve one channel ICC4R for a next cache operation. The PPM logic management can maintain a one channel cache operation budget for fast response. Based on a usage model of a memory system, this PPM internal budget reservation procedure can be tuned for fast response.

Additionally, if one channel reserved budget is not enough, cache busy time can be delayed to schedule the power budget. Though cache busy time is typically short, such as 10 µs for example, timing signals can be delayed to align peak power budget, until there is PPM power budget to allow the cached operations to take place. A control signal from the PPM logic management of a memory die can be used to stall the sense amplifier in a mad cache operation and the page buffer in a write cache operation, based on priorities of which operations in the PPM logic management need to make progress. For example, there is little or no advantage to delay sensing or programming over the cached timings if the system performance budget would suffer. In some instances, delaying the cache transfer may be performed to provide PPM budget to allow memory array operations to move forward.

In various embodiments, peak power management is provided to memory die cache operations across channels. Taking into account cache current operations can help improve the PPM efficiency and mitigate efficiency issues associated with increasing data path speed and power rail switching. This approach can take into consideration future changes in memory die cache use, such as NAND memory cache use, in which behaviour of cache operations moves towards large cache current, which may be 50% of system ICC peak power budget, with fast operation time, for example, at a 10 µs level compared with memory array operations. An improved PPM design to manage memory die cache operations as well as memory array operations of the memory die can address a low efficiency issue associated with increased memory die cache frequency and data path switching power rail from Vccq to Vcc of conventional approaches.

In various embodiments. PPM logic management can be structured to manage cache operations in a memory die in combination with memory array operations of the memory die and can be structured to provide feedback to a system memory controller to slow down a working frequency of an interface coupling the system memory controller to the memory die, based on the PPM logic management managing a current budget. The slowdown of the working frequency of the interface can be performed to reduce current operations of a cache of the memory die, if the PPM calculated total peak power budget will exceed system peak power budget. The memory die can be a NAND memory die with the interface being an interface structured according to ONFI specifications. The memory dies in a PPM group can still continue cache operations with low ONFI frequency in write operations of a cache of a NAND memory die. In write operations of a NAND cache, a write cache slow down can be accepted and does not adversely affect system performance.

Cache operation of a NAND memory die dealing with current is almost linear with respect to ONFI data burst frequency. On an interface operating according to ONFI specifications, the ONFI data burst frequency refers to the toggling frequency of the data strobe (DQS) as a function of clock. This frequency depends on the timing mode under which the system memory controller is running. An approach to managing a current budget can include a combination of features with at least one frequency related to interface frequency operation. First, as discussed above, the NAND cache operation can be included into the NAND PPM managing scheme with the memory array operations so that memory array operations and the cache operations share the total peak power budget to make system peak power control more efficient without much performance penalty. The second feature can include a hardware feedback to the system memory controller to automatically slow down or speedup the ONFI data burst frequency of the system memory controller. The feedback signal can be provided by using an existing NAND memory die pad such as the ZQ pad, where the ZQ pad is a pad provided for I/O impedance (Z) calibration. The feedback signal can be provided using a RB pad of a NAND memory die, where the RB pad provides a pin for ready/busy output, which indicates the status of the device operation. The feedback signal can be provided by creating a new pad for the NAND memory die to feedback just high and low status. The feedback signal can be provided by an analog voltage based on the ONFI frequency suggested by NAND PPM logic management. An internal ONFI frequency generator of the system memory controller can be tuned by this hardware channel feedback.

Figure 5:
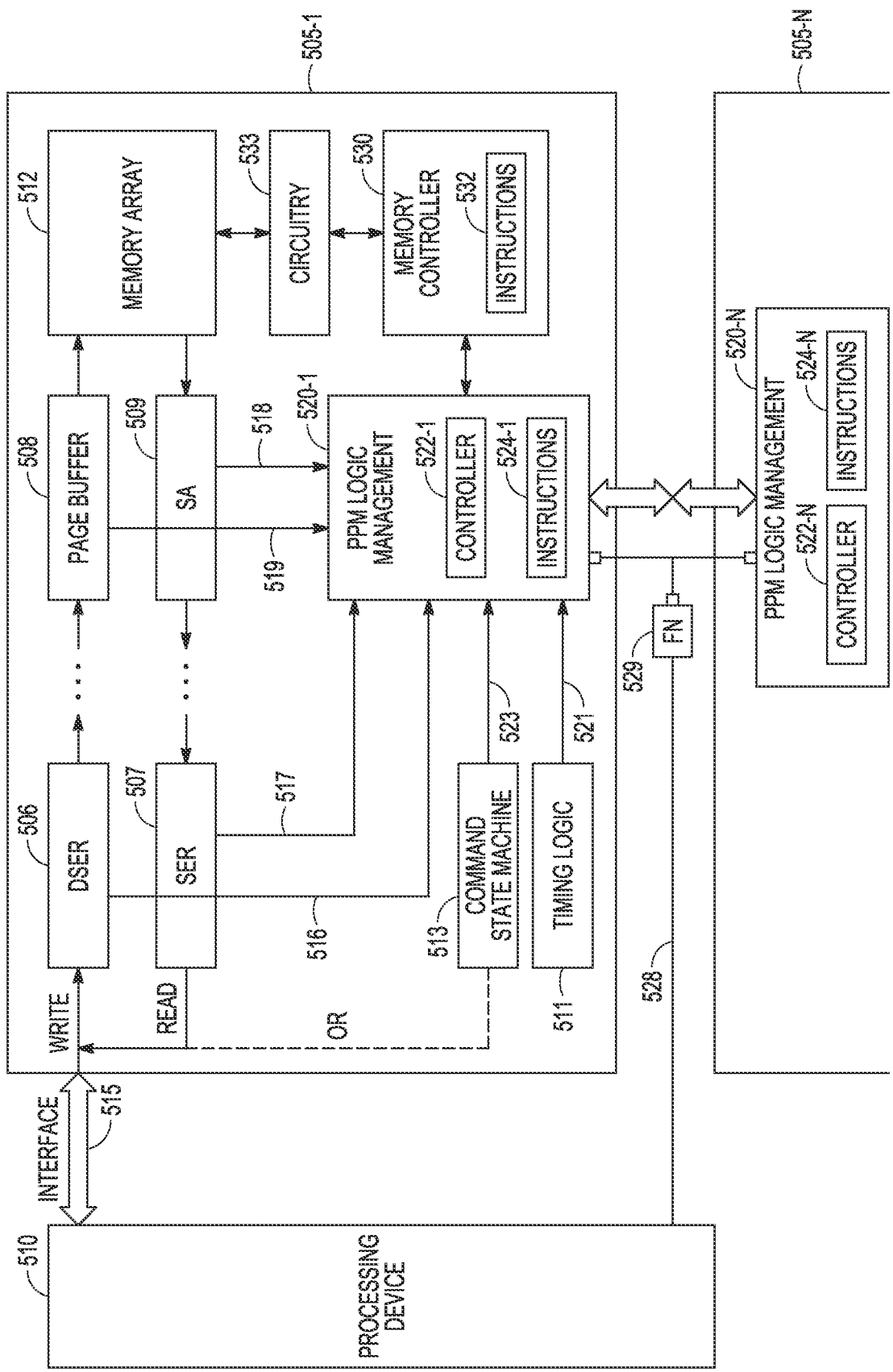
FIG. 5 illustrates an example memory die coupled to a processing device via an interface and a feedback connection, in accordance with various embodiments.

FIG. 5 illustrates an embodiment of an example memory die 505-1 coupled to a processing device 510 via an interface 515 and a feedback connection 528. Memory die 505-1 can also be coupled to another memory die 505-N. Though not shown, memory die 505-1 can be coupled to other memory dies. These memory dies can be NAND memory dies with interface 515 being an interface structured according to ONFI specifications. The memory die 505-1, memory die 505-N, and other memory dies coupled to the memory die 505-1 can be arranged in a memory device package such as memory device package 103 of FIG. 1. The memory device package is not shown in FIG. 5 for ease of discussion of memory die 505-1. The processing device 510 can be external to the memory device package that contains the memory die 505-1. Processing device 510 can include processing circuitry having one or more processors, where the processing device 510 is configured to perform operations to write to and read from the memory die 505-1 and other memory die associated with the memory die 505-1. The processing device 510 can be oriented for user devices to interact with the memory die 505-1 and other memory die associated with the memory die 505-1. The processing device 510, the interface 515, and memory die 505-1 . . . 505-N can be implemented to include components and perform functions similar to the processing device 210, the interface 215, and memory die 205-1 . . . 205-N of FIG. 2.

The memory die 505-1 can include, among other components, deserializer circuitry 506, a page buffer 508, a memory array 512, a memory controller 530 with associated with instructions 532, circuitry 533 coupling the memory array 512 to the memory controller 530, a sense amplifier 509, serializer circuitry 507, timing logic 511, PPM logic management 520-1 having a controller 522-1 with associated instructions 524-1. The memory die 505-1 can be coupled to the processing device 510 via the feedback connection 528 using a feedback node 529. The circuitry 533 can be implemented with CMOS circuitry or its equivalent. Other components of the memory die 505-1 are not shown for ease of discussion of components and functions to control current budget for cache operations and memory array operations of the memory die 505-1. The components and functions to control the control budget can be implemented with respect to the PPM logic management 520-1.

In addition to the controller 522-1 and instructions 524-1, the PPM logic management 520-1 can include logic circuits and registers. The logic circuits and registers can be used in receiving signals from other components of the memory die 505-1. The controller 522-1 can include processing circuitry, including one or more processors, and can be configured to perform peak power management operations for the memory die 505-1 by executing instructions 524-1. Execution operations of the PPM logic management 520-1 can include communicating current budgets with other PPM logic management components of other memory die located in a memory device package with memory die 505-1. For example, memory die 505-N can include a controller 522-N and instructions 524-N that can operate similar to controller 522-1 and instructions 524-1 of memory die 505-1. The controller 522-1 can be a dedicated controller for the PPM logic management 520-1. Alternatively, the controller 522-1 can be the controller for the memory die 505-1 that handles operations of the memory array 512 with the instructions 524-1 dedicated to conduct peak power management for the memory die 505-1. The PPM logic management 520-1 can be a dedicated state machine that handles all PPM related items.

For a write operation to the memory array 512 of the memory die 505-1, data received at the deserializer circuitry 506 as serial data in from the interface 515 is output as parallel data on a data path to the page buffer 508 for programming the memory array 512. Additional circuitry can be located along the data path from the deserializer circuitry 506 to the page buffer 508. The memory array 512 is relatively slow to program, compared to propagation speed in the memory die 505-1. In addition, with a memory array such as memory array 512 arranged with MLCs, more operations are involved with programming the memory array 512. To address the complexity of programming data into the memory array 512, data is received and held in the page buffer 508 as other data is loaded into the memory array 512. The page buffer 508 provides a cache to allow loading additional data ahead of the data transfer for the next programming of data into the memory array 512 to enhance performance. Associated with the cache operation of the page buffer 508 is consumption of current using power provided to the memory die 505-1 using Vcc.

For a read operation from the memory array 512 of the memory die 505-1, data is provided to the sense amplifier 509 from the memory array 512. Data is held in the sense amplifier 509 as data is loaded from the memory array 512. The sense amplifier 509 provides a cache to allow collecting of data ahead of data transfer from the memory die 505-1. Data loaded into the sense amplifier 509 is sent to the serializer circuitry 507, which can serialize the data for output to the interface 515. Additional circuitry can be located along the data path from the sense amplifier 509 to the serializer circuitry 506. Associated with the cache operation of the sense amplifier 509 is consumption of current using power provided to the memory die 505-1.

For write and read cache operations, a command state machine or circuits along a data path between the interface 515 and the memory array 512 can provide signals to be monitored by the PPM logic management 520-1. The use of the signals with respect to write and read cache operations in the memory die 505-1 can provide a mechanism to pass information of current usage in the write and read cache operations to the PPM logic management 520-1. The PPM logic management 520-1 can update parameters that it uses and update the status of cache operations and memory array operations with respect to current usage. The PPM logic management 520-1 can communicate with other memory dies, such as memory die 505-N, to share information regarding current budget for cache and memory array operations. Based on updating the current budget using the signals, the PPM logic management 520-1 can provide feedback to the memory controller 530 to control write and read operations within the memory array 512.

For a write cache operation, for example, the deserializer circuitry 506 can be used to identify a start of the write cache operation, and the page buffer 508 can be used to identify a stop of the write cache operation. Identification of a first specified event in a timing pattern input to the deserializer circuitry 506 can be used to generate a signal from the deserializer circuitry 506 to the PPM logic management 520-1 along a path 516. This signal provides a first flag received from the data path identifying the start of the write cache operation on the data of the write operation. Identification of a second specified event in the timing pattern input to the page buffer 508 can be used to generate a signal from the page buffer 508 to the PPM logic management 520-1 along a path 518. This signal provides a second flag received from the data path identifying the end of the write cache operation on the data of the write operation. Comparison circuits can be used to identify the occurrence of the first and second specified events. The timing logic 511 of the memory die 505-1 can be used as a monitor of the cache operation by providing a signal along path 521 to the PPM logic management 520-1. The timing logic 511 can be used to identify an interface timing mode for data-in in the write cache operation. Alternatively, a command state machine 513 can be used as a monitor of the cache operation by providing a signal along path 523 to the PPM logic management 520-1. The determination of start and stop cache operations for write operations are not limited by the use of the deserializer circuitry 506 and the page buffer 508. Other circuits in the data path from the interface 515 to the memory array 512 can be used to provide signals as flags to participate in the PPM of the memory die 505-1.

For a read cache operation, for example, the sense amplifier 509 can be used to identify a start of the read cache operation, and the serializer circuitry 507 can be used to identify a stop of the read cache operation. Identification of a first specified event in a timing pattern to the memory die 505-1 can be used to generate a signal from the sense amplifier 509 to the PPM logic management 520-1 along a path 519. This signal provides a first flag received from the data path identifying the start of the read cache operation on the data of the read operation. Identification of a second specified event in the timing pattern input to the memory die 505-1 can be used to generate a signal from the serializer circuitry 507 to the PPM logic management 520-1 along a path 517. This signal provides a second flag received from the data path identifying the end of the read cache operation on the data of the read operation. Comparison circuits can be used to identify the occurrence of the first and second specified events. The timing logic 511 of the memory die 505-1 can be used as a monitor of the cache operation by providing a signal along path 521 to the PPM logic management 520-1. The timing logic 511 can be used to identify an interface timing mode for data-out in the read cache operation. Alternatively, a command state machine 513 can be used as a monitor of the cache operation by providing a signal along path 523 to the PPM logic management 520-1. The determination of start and stop cache operations for read operations are not limited by the use of the sense amplifier 509 and the serializer circuitry 507. Other circuits in the data path from memory array 512 to the interface 515 can be used to provide signals as flags to participate in the PPM of the memory die 505-1.

The PPM logic management 520-1 uses the flags for the write cache operation and the read cache operation as a determination that current is being used in the respective cache operation. The amount of current used during the identified cache operation used can be taken to be a fixed amount stored or hardcoded in the PPM logic management 520-1. Alternatively, a lookup table accessed by the PPM logic management 520-1 can be used, where the lookup table has current values based on programmed timing modes or speeds of the data path for the respective write or read cache operation. At the time of the generation of the flags for the cache operation, the value in the lookup table can be selected using the signal from the timing logic 511.

In addition to receiving flags from data paths in cache operations associated with operating the memory array 512, the PPM logic management 520-1 receives information regarding memory array operations from the memory controller 530. Using the received flags and the received information from the memory controller 530, the PPM logic management 520-1 can monitor operations associated with the memory array 512 and the page buffer 508 in write operations and associated with the memory array 512 and the sense amplifier 509 in read operations and calculate total peak power used by the memory array and the respective cache. This total peak power can be calculated in terms of current. Activity associated with a separate reserved current budget for caches by an external user device to the memory device can be avoided.

A cache operation and a memory array operation can be operating at the same time. Since the memory die 505-1 has a constant Vcc provided during operation of the memory die 505-1, the peak current is a parameter to be managed according to a current budget. During programming of the memory array 512, pulses are used, which is accompanied by periods of relatively high current and periods of relatively low current. The PPM logic management 520-1 on memory die 505-1, taking into account the total current of cache operations and memory array operations, can use high current peak time and low current peak time to stagger when data is allowed to move into or out of the memory array 512. The PPM logic management 520-1 communicates with the memory controller 530 to control the staggering or pausing in the movement of data in the memory array 512.

The memory controller 530 can include processing circuitry, including one or more processors, and can be configured to perform operations on the memory array 512 by executing instructions 532. The memory controller 530 with the instructions 532 can be structured as firmware for the memory die 505-1 to control functions of the memory array 512. The memory controller 530 can be a dedicated programmable controller to operate as firmware or may be a main memory controller for the memory die 505-1 to execute operations according to instructions 532. Firmware code in the programmable memory controller 530, used to implement array mad and program operations, makes a request to the PPM logic management state machine before entering "high current peak" operations. The PPM logic management 520 acknowledges the operation or can put it on hold depending on the overall system current budget, which includes the current budget of other memory dies arranged with the memory die 505-1 in a memory device package. In other examples, at least some portion of the instructions executed by memory controller 530 may be stored in other memory structures and loaded, for example into local memory of the memory controller 530 for execution. The memory controller 530 waits until it receives, from the PPM logic management 520-1, a signal to proceed before executing code in the instructions 532 that cause ICC peaks in memory array operation of the memory die 504-1.

The PPM logic management 520-1 can continually monitoring both memory array operations and cache operations to calculate total peak power and communicate between all memory dies within a PPM group. The PPM logic management 520-1 can use one or more pads of the memory die 505-1 to communicate with the PPM logic management of the other memory dies with the PPM group to indicate when the available budget is not enough for supporting full speed cache operations. The one or more pads can be pads of a memory die such as a ZQ pad of a NAND memory die, which can have other functions. Alternatively, the one or more pads can be dedicated pads of a memory die. Other memory dies of the PPM group, of which memory die 505-1 is a member, can be coupled together at the respective pads of the memory dies to indicate when the available budget is not enough for supporting full speed cache operations. The PPM logic management 520-1 can generate a toggled signal or an analog signal as indicator, if the available budget is not enough for supporting full speed cache operations. This pad channel, shared among the memory dies of the same PPM group can be connected to the processing device 510 by feedback connection 528 via feedback node (FN) 529, with the processing device 510 being a system memory controller for the memory dies. This pad channel can be shared as a reference, a voltage control oscillator (VCO) input, or other input of an interface frequency modulation circuit, such as a ONFI frequency modulation circuit. The processing device 510 can tune and slow down the interface speed during data burst based on this hardware feedback.

Figure 6:
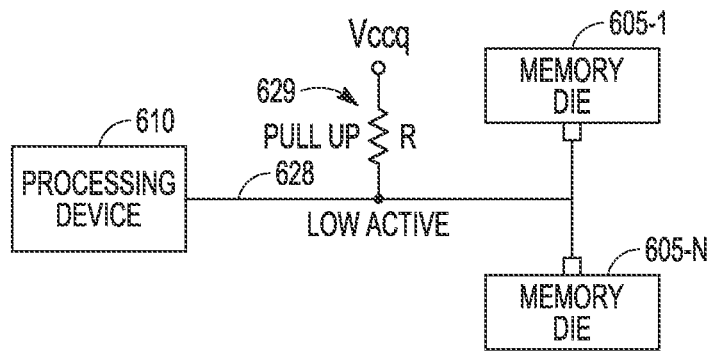
FIGS. 6-8 show example feedback nodes used to feedback a signal to a processing device from memory dies along a feedback connection, in accordance with various embodiments.

FIG. 6 illustrates an embodiment of an example feedback node 629 used to feedback a signal to a processing device 610 from memory dies 605-1 and 605-N along a feedback connection 628. The processing device 610 and memory dies 605-1 and 605-N can be implemented similar to the processing device 510 and memory dies 505-1 and 505-N of FIG. 5. The processing device 610 can be implemented as a system memory controller for the memory dies. The PPM logic management of memory dies 605-1 can, for example, toggle a feedback signal using a pull-up resistor coupled between Vccq and the feedback connection 628. With the feedback circuit being in a digital state, such as an active low in FIG. 6, and the PPM logic management determining that there is not enough budget for a one channel cache operation budget, the PPM logic management will pull down the feedback channel and the processing device 610 can operate with half speed or other predefined low interface speed.

Figure 7:
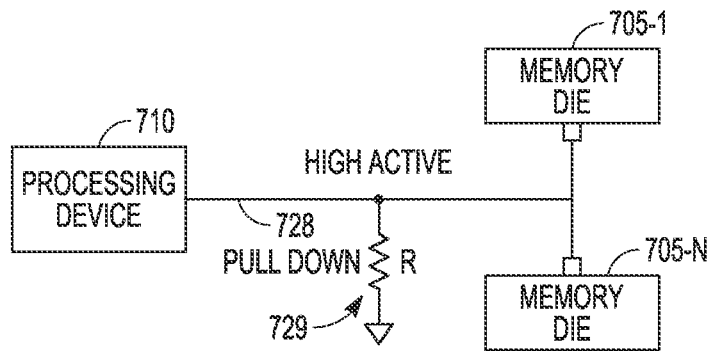

FIG. 7 illustrates an embodiment of an example feedback node 729 used to feedback a signal to a processing device 710 from memory dies 705-1 and 705-N along a feedback connection 728. The processing device 710 and memory dies 705-1 and 705-N can be implemented similar to the processing device 510 and memory dies 505-1 and 505-N of FIG. 5. The processing device 710 can be implemented as a system memory controller for the memory dies. The PPM logic management of memory device 705-1 can, for example, toggle a feedback signal using a pull-down resistor coupled between the feedback connection 628 and ground or low reference voltage. With the feedback circuit being in a digital state, such as an active high in FIG. 7, and the PPM logic management determining that there is not enough budget for a one channel cache operation budget, the PPM logic management will pull up the feedback channel and the processing device 710 can operate with half speed or other predefined low interface speed.

Figure 8:
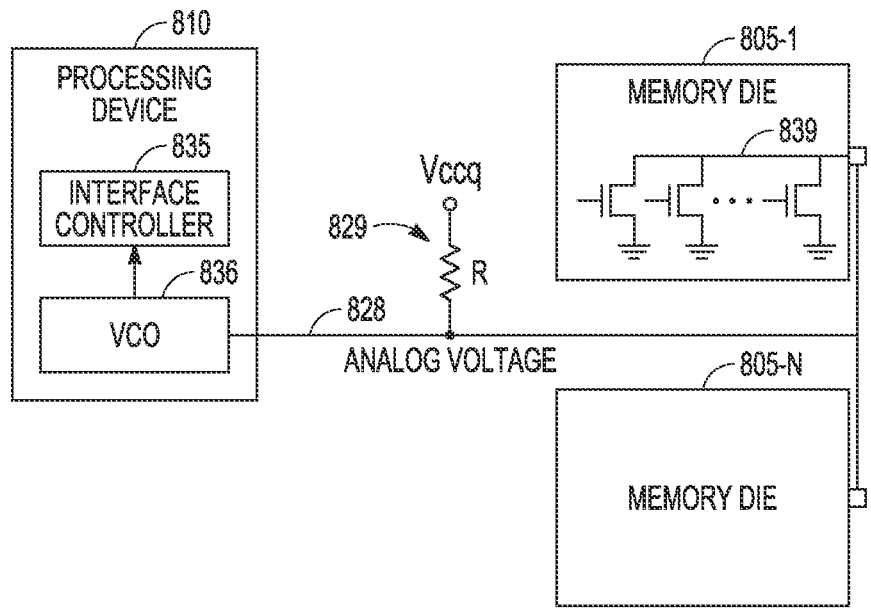

FIG. 8 illustrates an embodiment of an example feedback node 829 used to feedback a signal to a processing device 810 from memory dies 805-1 and 805-N along a feedback connection 828. The processing device 810 and memory dies 805-1 and 805-N can be implemented similar to the processing device 510 and memory dies 505-1 and 505-N of FIG. 5. The processing device 810 can be implemented as a system memory controller for the memory dies. The feedback node 829 can include a resistor coupling the feedback connection 828 to Vccq. The PPM logic management of memory die 805-1 can, for example, provide a feedback that is an analog voltage. Based on the voltage value, the feedback can modulate the interface speed of the processing device 810 directly in the processing device 810 using a VCO 836 and interface controller 835 of the processing device 810. Memory die 805-1, and other memory dies of a common PPM group, can have different legs 839 to be turned on or off to create different analog voltage on feedback connection 828.

PPM logic management of memory dies such as those discussed with respect to FIGS. 5-8 can treat cache operation as a highest priority. If the PPM logic management determines that there is not enough budget for next cache operations, it start to release peak power budget internally by making internal adjustments such as by adjusting the budget for memory array operations budget to be lower. Then, after some microseconds, the memory die can pause the memory array operation or force entry into a low peak power mode for the memory array operation to release the budget. The PPM logic management can toggle or change voltage at a hardware feedback pad to show there is enough budget. A processing device, arranged as a system memory controller, can resume the cache operation at full speed in a next data burst.

Figure 9:
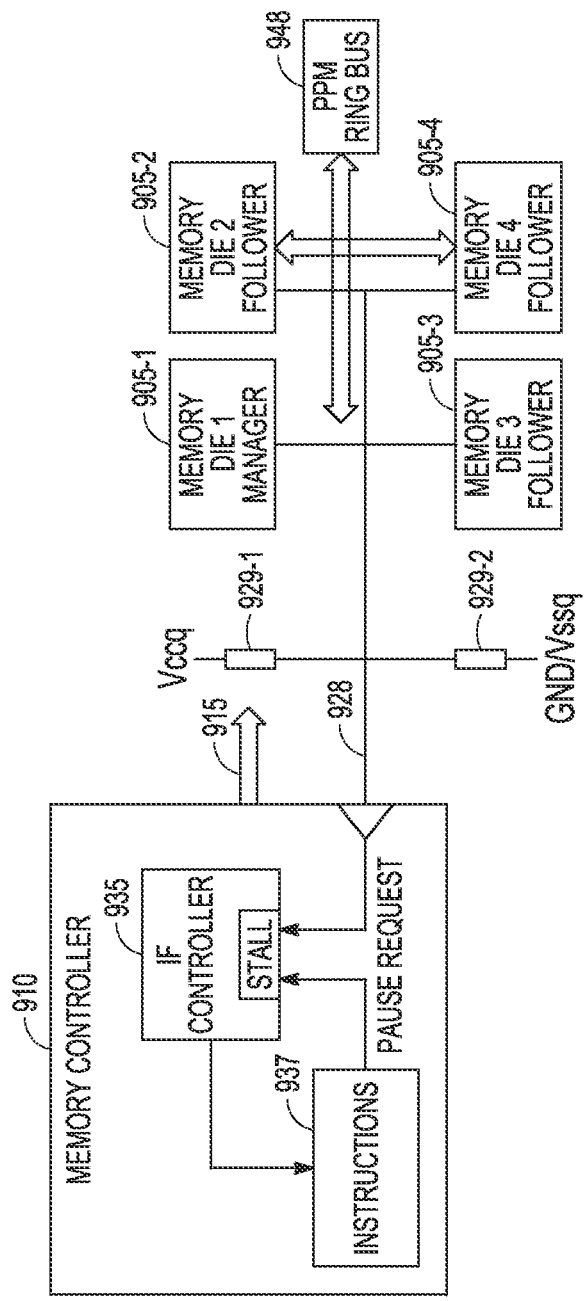
FIG. 9 is a block diagram illustrating an example memory controller external to a set of memory dies with the memory controller arranged to receive a feedback signal from one or more of these memory dies, in accordance with various embodiments.

FIG. 9 is a block diagram illustrating an embodiment of an example memory controller 910 external to a set of memory dies with the memory controller 910 arranged to receive a feedback signal from one or more of these memory die. The set of memory dies can include memory dies 905-1, 905-2, 905-3, and 905-4 in a memory device package. Though four memory dies are shown, the set of memory dies can be more or less than four. These memory dies can be NAND memory dies with an interface 915 being an interface structured according to ONFI specifications. The memory dies 905-1, 905-2, 905-3, and 905-4 can be arranged in a memory device package such as memory device package 103 of FIG. 1. The memory device package is not shown in FIG. 9 for ease of discussion with respect to a feedback connection 928 to the memory controller 910. The memory controller 910 can be external to the memory device package that contains the memory dies 905-1, 905-2, 905-3, and 905-4. Memory controller 910 can include processing circuitry having one or more processors, where the memory controller 910 is configured to perform operations to write to and read from the memory dies 905-1, 905-2, 905-3, and 905-4. The memory controller 910 can be oriented for user devices to interact with the memory dies 905-1, 905-2, 905-3, and 905-4. The memory controller 910, the interface 915, and memory dies 905-1, 905-2.905-3, and 905-4 can be implemented to include components and perform functions similar to the processing device 510, the interface 515, and memory die 505-1 . . . 505-N of FIG. 5 and other functions associated with the processing device 510, the interface 515, and memory die 505-1 . . . 505-N of FIG. 5.

The memory dies 905-1, 905-2, 905-3, and 905-4 can be configured as a PPM group that can share a total current budget, where each of the memory dies 905-1, 905-2, 905-3, and 905-4 has a PPM logic management. The memory array of each memory die has peak times and non-peak times of operation using current such that there are periods in which one memory die operates and another memory dies stalls. The operation and staggering of the memory arrays of the different memory dies can be managed. In addition, the data path in the memory dies can also be orchestrated or staggered in this fashion. The orchestration of the memory arrays of the memory dies 905-1, 905-2, 905-3, and 905-4 can be controlled using one memory die of the PPM group. In the example arrangement of FIG. 9, memory die 905-1 is assigned to be the manager die of the memory dies 905-1, 905-2, 905-3, and 905-4. The memory dies 905-2, 905-3, and 905-4 are configured as follower memory dies. The assignment of the memory die 905-1 can be made by the memory controller 910. Each of the memory dies 905-1, 905-2, 905-3, and 905-4 can be structured with the instrumentality to operate as a manager memory die once selected to be the manager memory die. Each of the memory dies 905-2, 905-3, and 905-4 are effectively self-controlled in that each memory die's PPM logic management can be programmed with a current budget of the amount of current that the memory die is allowed to be concurrently budgeted at any one time. The PPM logic management of one memory die can communicate to the PPM logic management of the other memory die in the PPM group so that each memory die have information of the activity of the other memory dies. With such information, each memory die can conduct their own budgeting and staggering. The manager memory die 905-1 can control the initialization of the communication among the memory dies 905-1, 905-2, 905-3, and 905-4 to share the total current budget. Communication among the memory dies 905-1.905-2, 905-3, and 905-4 can use a round-robin token protocol communication using a PPM ring bus 948. The ring bus 948 can include HC and ICLK lines that can be driven by manager memory die 905-1.

The memory dies 905-1, 905-2, 905-3, and 905-4 of a memory device package may be coupled on one channel with the memory device package having multiple sets of memory dies coupled to different channels. In an instance of one memory die on each channel of a multiple channel memory device package beginning to perform read or write cache operations at the same time, there can be an issue of exceeding a total current budget while PPM budgets are already full. The feedback connection 928 can be used to avoid the system peak power blowing out the total target budget. A signal on the feedback connection 928 from one or more the memory dies 905-1, 905-2, 905-3, and 905-4 can be used to pause data operations on a channel from the memory controller 910. The signal on the feedback connection 928 is an indicator of peak power. The memory controller 910 can include instructions 937 that upon receiving the indicator can cause an interface controller 935 of the memory controller 910 to stall the I/O operation of the interface 915. The stall can provide a delay to the memory die affected by the stall that can adjust current usage to maintain the current budget of the memory die. The indicator from the one or more the memory dies 905-1, 905-2, 905-3, and 905-4 can be received as a pause request at the interface (IF) controller 935, which can provide an appropriate notification to the instructions 937. Alternatively, the pause request can be received at the instructions 937 from the input to the memory controller 910. The indicator can be provided by the feedback connection 928 using arrangements such as shown in FIGS. 6-8. For example, Vccq can be coupled to the feedback connection 928 by an impedance 929-1 and Vssq can be coupled to the feedback connection 928 by an impedance 929-2.

For ease of presentation, FIG. 9 shows one channel, while the memory device package can include other sets of memory dies, coupled to respective channels, that include feedback connections to the memory controller 910. The I/O path from the memory controller 910 can be paused by each channel by monitoring respective peak power indicators from the sets of memory dies. The pausing can be performed at the nanosecond level. The peak power indicator can be driven by using only a manager memory die, which can wait for its token turn in the round-robin token protocol communication. A fast response can be attained with all memory dies driving output of the indicator upon determination that the current budget is exceeding a threshold portion of the total current budget.

FIGS. 10-13 illustrate embodiments of example uses of an indicator signal or a signal from a ready/busy pad of a memory die with respect to stalling data output from an interface to a memory die from a processor device with respect to cache current and memory array operations. The indicator signal or the signal from the ready/busy pad can be driven by PPM logic management such as associated with FIGS. 5-9.

Figure 10:
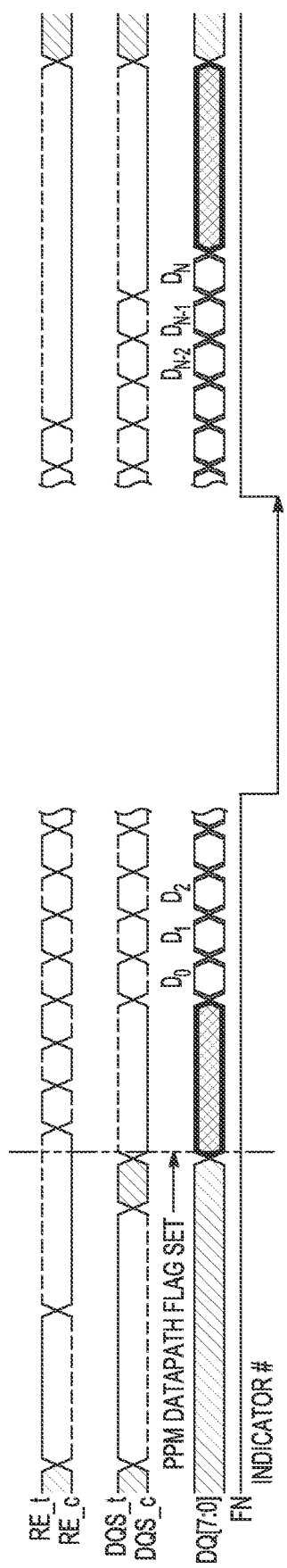
FIGS. 10-13 illustrate example uses of an indicator signal or a signal from a ready/busy pad of a memory die with respect to stalling data output from an interface to a memory die from a processor device with respect to cache current and memory array operations, in accordance with various embodiments.

FIG. 10 shows an example of use of an indicator signal with respect to a request to stall data out to lower ICC4R. For example, consider a PPM budget equal to 800 mA, where ICC4R operation uses 0 mA and the memory array uses 800 mA. A PPM data path flag is received in a PPM logic management that sets an indication of beginning of a read cache operation, where there is a request of 150 mA for ICC4R with the memory array operation at 800 mA, which exceeds the 800 mA PPM budget. In response to the PPM data path flag being received by the PPM logic management, the PPM logic management fires an indicator signal, which can be set to a low, to the memory controller, since the ICC budget is exceeded. Upon reception of the indicator signal, the interface controller of the interface from the memory controller to the memory device can pause the read signal RE #, when the indicator signal goes low to provide a stall to allow adjustment of the current budget. When the stall provides for the current to be within current budget, for example 150 mA being allocated to budget ICC4R and the memory array having a budget of 600 mA, the indicator signal can be removed by raising the indicator signal to a high.

Figure 11:
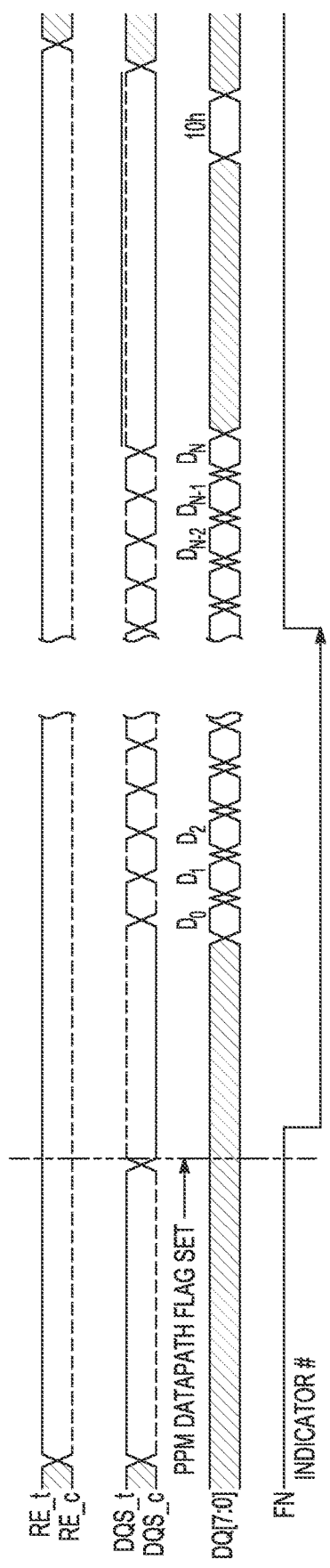

FIG. 11 shows an example use of an indicator signal with respect to a request to stall data out to lower ICC4 W. For example, consider a PPM budget equal to 800 mA, where ICC4 W operation uses 0 mA and the memory array uses 800 mA. A PPM data path flag is received in a PPM logic management that sets an indication of a beginning of a write cache operation, where there is a request of 200 mA for ICC4 W with the memory array operation at 800 mA, which exceeds the 800 mA PPM budget. In response to the PPM data path flag being received by the PPM logic management, the PPM logic management fires an indicator signal, which can be set to low, to the memory controller, since the ICC budget is exceeded. Upon reception of the indicator signal, the interface controller of the interface from the memory controller to the memory device can pause the DQS, when the indicator signal goes low to provide a stall to allow adjustment of the current budget. When the stall provides for the current to be within current budget, for example 200 mA being allocated to budget ICC4 W and the memory array having a budget of 600 mA, the indicator signal can be removed by raising the indicator signal to a high.

Figure 12:
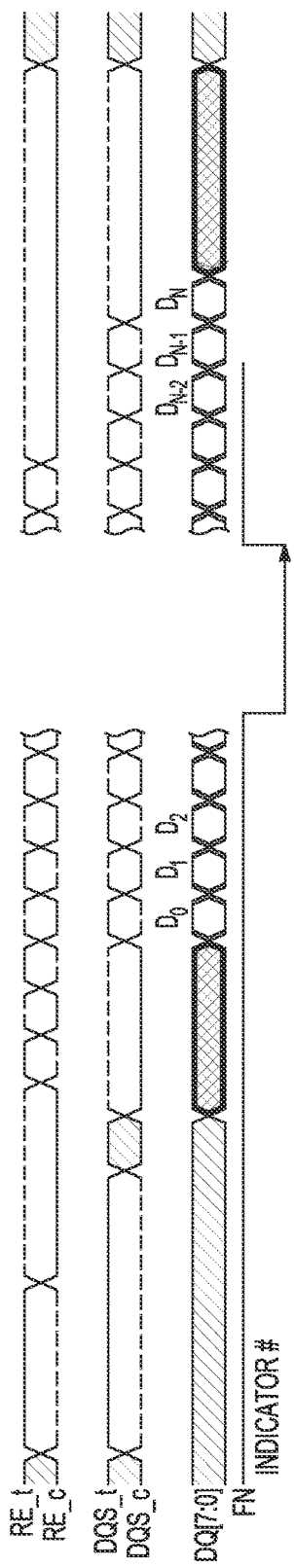

FIG. 12 shows an example use of an indicator signal with respect to a request to stall data out to lower ICC4R/W. For example, consider a PPM budget equal to 800 mA, where ICC4R operation uses 150 mA and the memory array uses 600 mA, which is less than the PPM budget. Further, consider the case when ICC4R goes to 0 mA and the memory array uses 800 mA, which is at the PPM budget limit. The PPM logic management is provided information regarding the memory array current by the controller of the memory die that executes instructions, for example firmware, for reading and writing. With the combination of ICC4R and memory array current at the budget limit, the PPM logic management can fire an indicator signal, which can be set to a low, to the memory controller. Upon reception of the indicator signal, the interface controller of the interface from the memory controller to the memory device can pause the RE #, when the indicator signal goes low to provide a stall to allow adjustment of the current budget, before the ICC budget is exceeded. When the stall provides for the current to be lower than the current budget limit, for example 150 mA being allocated to budget ICC4R and the memory array having a budget of 600 mA, the indicator signal can be removed by raising the indicator signal to a high. There can be a threshold level within the budget at which the stall feature can be used to avoid exceeding the budget. FIG. 12 demonstrates that the indicator signal can be used not only with increased cache current, but when the memory array current causes the current budget to be reached or exceeded.

Figure 13:
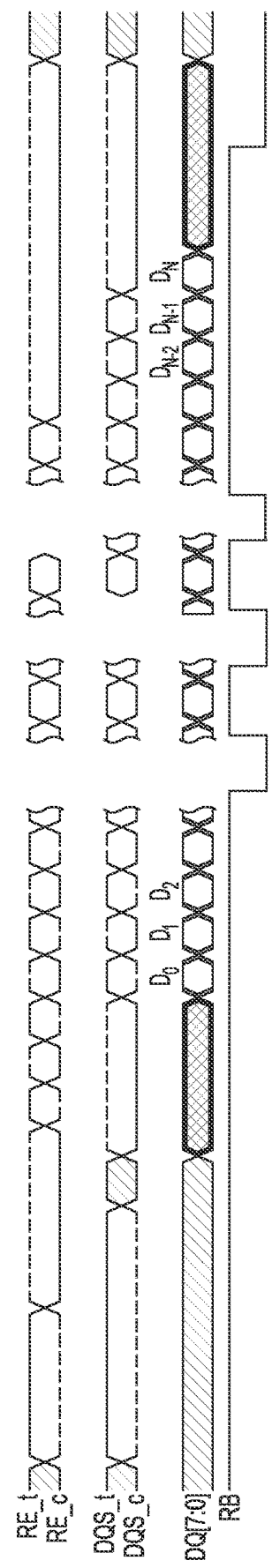

FIG. 13 shows an example use of the RB signal to stall data out to lower ICC4R. Upon reception of the RB signal, the interface controller of the interface from the memory controller to the memory device can pause the RE #, when the RB signal goes low to provide a stall to allow adjustment of the current budget. In this example, the RB signal goes high and low a number times, which can be the result of the ICC4R budget having a duty cycle. Consider a system budget of 800 mA with a budget limit for memory array current of 700 mA and a ICC4R budget of 100 mA at 200 mA full duty cycle. When the memory array current is at 700 mA and the ICC4R is higher than 100 mA in its cycle, the system budget of 800 mA would be exceeded. The PPM logic management can fire the RB signal low when the ICC budget of the memory array of 700 mA is used up with the ICC4R budget at 50% duty cycle of 100 mA. The RB signal pulses at a duty cycle can represent that power savings are needed.

Figure 14:
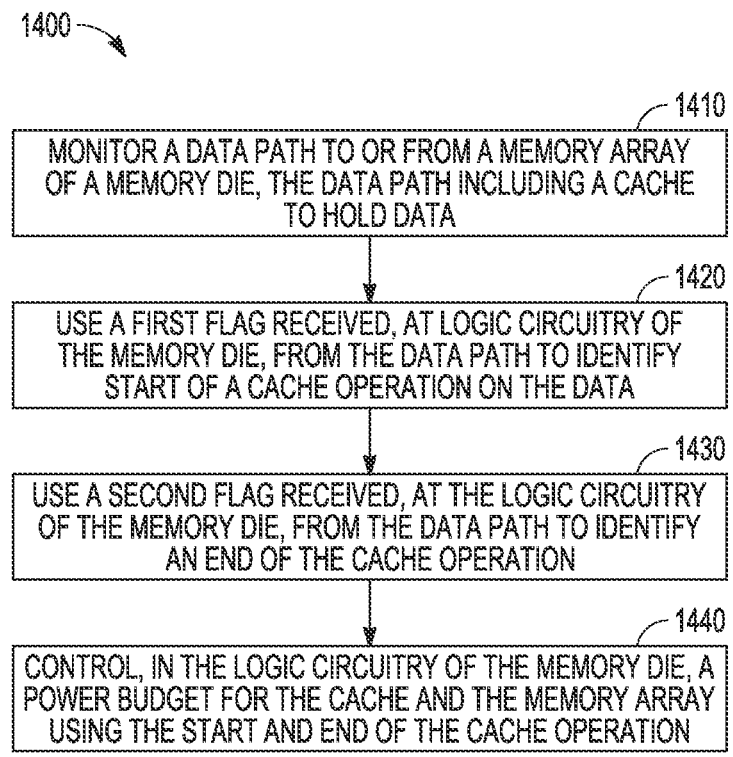
FIG. 14 is a flow diagram of an example method of controlling peak power management in a memory device, in accordance with various embodiments.

FIG. 14 is a flow diagram of an embodiment of an example method 1400 of controlling peak power management in a memory die. At 1410, a data path to or from a memory array of a memory die is monitored, where the data path includes a cache to hold data. At 1420, a first flag, which is received at logic circuitry of the memory die from the data path, is used to identify start of a cache operation on the data. The logic circuitry can be realized by a controller with stored instructions. The controller can be implemented by processing circuitry including one or more processors. The logic circuitry can also include registers and logic circuits operable with the controller. The logic circuitry can be implemented as a PPM logic management, which can include a controller having processing circuitry including one or more processors, with the controller configured to perform operations for controlling peak power management in the memory die. At 1430, a second flag, which is received at the logic circuitry of the memory die from the data path, is used to identify an end of the cache operation. At 1440, a power budget for the cache and the memory array is controlled in the logic circuitry of the memory die, using the start and end of the cache operation.

Variations of the method 1400 or methods similar to the method 1400 can include a number of different embodiments that may be combined depending on the application of such methods and/or the architecture of memory devices in which such methods are implemented. Such methods can include receiving, at the logic circuitry of the memory die, a signal from timing logic of the memory die to monitor the cache operation, and accessing information in a lookup table in the memory die, where the information includes programmed timing modes of current or operational speed of the data path. The signal from the timing logic and the information is used in the logic circuitry of the memory die to determine current to be consumed during a write operation or a read operation associated with the cache operation.

Variations of the method 1400 or methods similar to the method 1400 can include calculating, in the logic circuitry of the memory die, a total peak power used by the memory array and the cache; and communicating the calculated total peak power to another memory die arranged in a peak power management group with the memory die. Controlling the power budget for the cache and the memory array can include using a filter to smooth out pauses in data transfer with respect to the current budget for the cache and the memory.

Variations of the method 1400 or methods similar to the method 1400 can include feeding back a signal to a memory controller coupled to the memory die by an interface to adjust an operating speed of the interface. The signal being fed back can be a toggle signal, or an analog signal generated from turning off or on different paths in the respective memory die.

In various embodiments, a memory device comprises a memory die including a memory array, a cache, and a controller. The cache can be arranged to hold data in a data path to or from the memory array. The controller can include processing circuitry including one or more processors. The controller can be configured to perform operations, where the operations can include controlling a power budget for the cache and the memory array by using a first flag received from a data path identifying start of a cache operation on the data and a second flag received from the data path identifying an end of the cache operation. The cache can be a page buffer of the memory die for a write cache operation, with the first flag being a signal from deserializer circuitry of the memory die and the second flag being a signal from the page buffer. The cache can be a sense amplifier of the memory die for a read cache operation, with the first flag being a signal from the sense amplifier and the second flag being a signal from serializer circuitry of the memory die. The controller can be arranged to operate with multiple caches associated with operation of the memory array. The controller can be arranged to operate with a first cache being a page buffer arranged to hold data in a data path to the memory array and with a second cache being a sense amplifier of the memory die to hold data in a data path from the memory array. The controller can be structured to operate to monitor other components to control a power budget for such other components and the memory array, with these other components used in the operation of the memory array.

Variations of such a memory device or similar memory devices can include a number of different embodiments that may be combined depending on the application of such memory devices and/or the architecture in which such memory devices are implemented. Such memory devices can include the controller being coupled to timing logic of the memory die to receive a signal to monitor the cache operation. The memory die can include a lookup table accessible to determine, using the signal from the timing logic, current to be consumed during a write operation or a read operation associated with the cache operation.

Variations of such a memory device or similar memory devices can include the controller configured to perform operations associated with a power budget for the cache and the memory array. Such operations can comprise determining availability of the power budget of a next cache operation, and, in response to a determination that the power budget is insufficient for the next cache operation, adjusting operation of the memory array to release an amount of peak power budget for the cache operation. Variations can include the controller being settable as a control manager to controllers of a set of managed memory dies to allow a selected die of the set to operate during an individual cache operation, while allowing the other dies of the set to stall with respect to respective cache and memory array operations.

The operations executed by the controller can comprise monitoring operations of the memory array and the cache, and calculating total peak power used by the memory array and the cache. The controller can be operable to communicate the calculated total peak power of the memory device to controllers of other memory die arranged in a peak power management group with the memory device. The controller can be operable to feedback a signal to a memory controller, external to the memory die, to adjust an operating speed of an interface from the memory controller to the memory die.

Variations of such a memory device or similar memory devices can include the controller having a filter to smooth out pauses in data transfer with respect to a current budget for the cache and the memory array to control the current budget. The filter can include a timer to release a cache operation budget in response to the timer reaching a filter time without a new cache operation occurring.

In various embodiments, a memory device comprises an input node to receive a supply voltage and multiple memory dies coupled to the input node, with the multiple memory dies arranged forming a peak power management group. Each memory die of the multiple memory dies can include a memory array, a cache, logic circuitry, and a connection to output data. The cache can be a component of the memory die to hold data in a data path to or from the memory array. The controller includes processing circuitry including one or more processors, with the controller configured to perform operations. The operations can include controlling a power budget for the cache and the memory array by using a first flag received from a data path identifying start of a cache operation on the data and a second flag received from the data path identifying an end of the cache operation. The connection to output data can be arranged to output data regarding the power budget to one or more other memory dies of the peak power management group.

The cache can be a page buffer of the memory die for a write cache operation, with the first flag being a signal from deserializer circuitry of the memory die and the second flag being a signal from the page buffer. The cache can be a sense amplifier of the memory die for a read cache operation, with the first flag being a signal from the sense amplifier and the second flag being a signal from serializer circuitry of the memory die. The controller can be arranged to operate with multiple caches associated with operation of the memory array. The controller can be arranged to operate with a first cache being a page buffer arranged to hold data in a data path to the memory array and with a second cache being a sense amplifier of the memory die to hold data in a data path from the memory array. The controller can be structured to operate to monitor other components to control a power budget for such other components and the memory array, with these other components used in the operation of the memory array.

Variations of such a memory device or similar memory devices can include a number of different embodiments that may be combined depending on the application of such memory devices and/or the architecture in which such memory devices are implemented. Such memory devices can include the controller of each memory die being coupled to timing logic of the memory die to receive a signal to monitor the cache operation. Each memory die of the multiple memory dies can include a lookup table accessible to determine, using the signal from the timing logic of the respective memory die, current to be consumed during a write operation or a read operation associated with the cache operation. One of the memory dies can be set as a manager to the one or more other memory dies of the multiple memory dies, with respect to operation as part of the peak power management group.

Variations of such a memory device or similar memory devices can include the controller of each memory die being operable to feedback a signal to a memory controller or interface controller to the multiple memory dies to adjust an operating speed of an interface to the memory dies. The signal being feedback can be a toggle signal, or an analog signal generated from turning off or on different paths in the respective memory die.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and Internet-connected appliances or devices (e.g., Internet-of-Things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, ROM, an solid-state drive (SSD), an multi-media controller (MMC), or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

Figure 15:
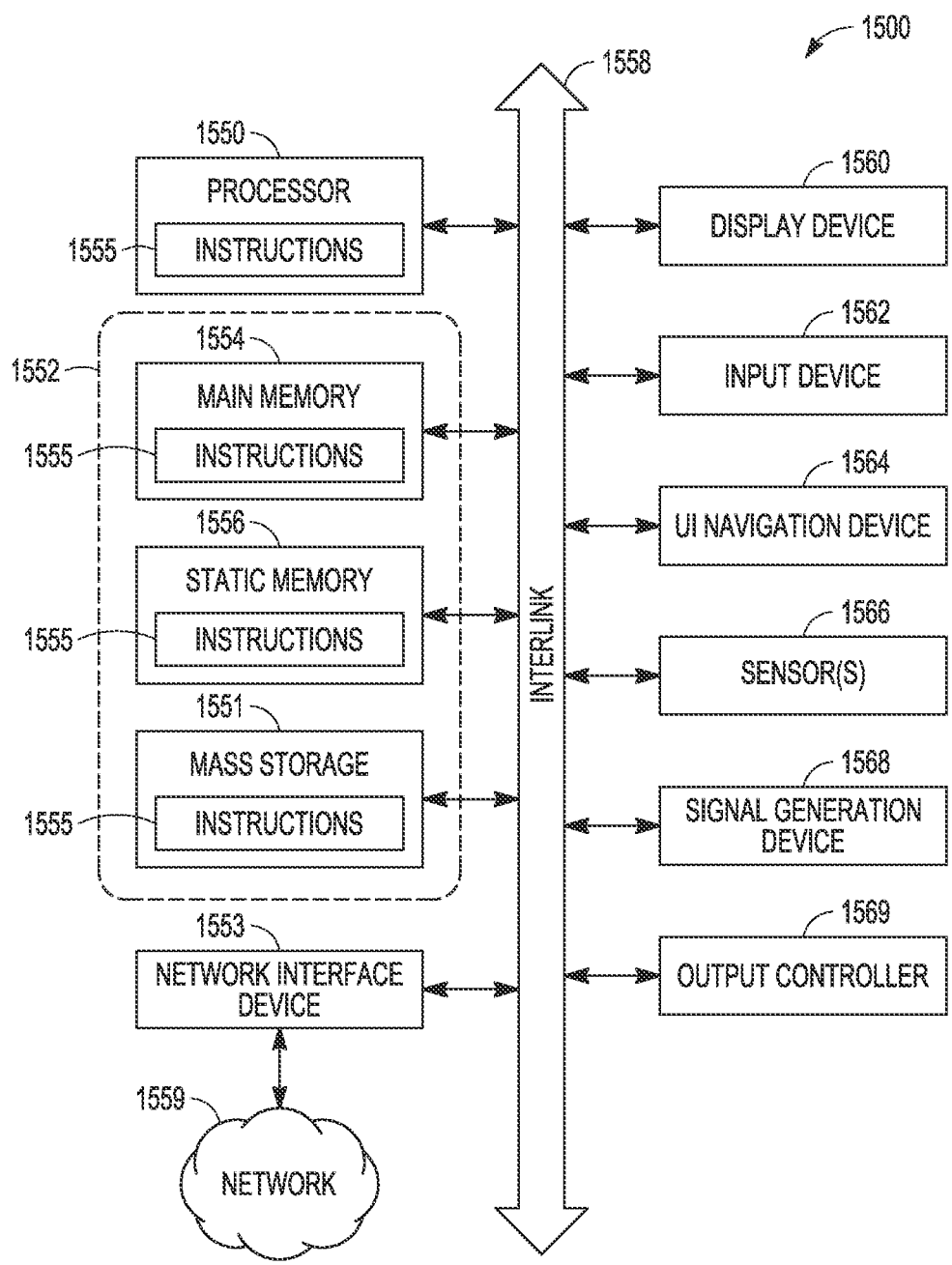
FIG. 15 illustrates a block diagram of an embodiment of an example machine having one or more memory devices structured with memory dies having logic management for peak power management, in accordance with various embodiments.

FIG. 15 illustrates a block diagram of an embodiment of an example machine 1500 having one or more memory devices structured with memory dies having PPM logic management. The PPM logic management of each of the memory dies can be structured to manage cache operations in the memory die in combination with memory array operations of the memory die and can be structured to provide feedback to a system memory controller for the memory die to slow down a working frequency of an interface coupling the system memory controller to the memory die, based on the PPM logic management managing a current budget. The PPM logic management can execute operations, as taught herein, with respect to but not limited to example embodiments associated with FIGS. 1-14. The machine 1500, having one or more such memory devices, may operate as a standalone machine or may be connected, for example networked, to other machines.

In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The example machine 1500 can be arranged to operate with one or more memory devices containing memory dies having PPM logic management, as taught herein.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1500 may include a hardware processor 1550 (e.g., a CPU, a GPU, a hardware processor core, or any combination thereof), a main memory 1554, and a static memory 1556, some or all of which may communicate with each other via an interlink (e.g., bus) 1558. The machine 1500 may further include a display device 1560, an alphanumeric input device 1562 (e.g., a keyboard), and a user interface (UI) navigation device 1564 (e.g., a mouse). In an example, the display device 1560, input device 1562, and UI navigation device 1564 may be a touch screen display. The machine 1500 may additionally include a mass storage device (e.g., drive unit) 1551, a signal generation device 1568 (e.g., a speaker), a network interface device 1553, and one or more sensors 1566, such as a global positioning system (GPS) sensor, compass, accelerometer, or other sensor. The machine 1500 may include an output controller 1569, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The machine 1500 may include a machine-readable medium 1552 on which is stored one or more sets of data structures or instructions 1555 (e.g., software) embodying or utilized by the machine 1500 to perform any one or more of the techniques or functions for which the machine 1500 is designed. The instructions 1555 may also reside, completely or at least partially, within the main memory 1554, within static memory 1556, or within the hardware processor 1550 during execution thereof by the machine 1500. In an example, one or any combination of the hardware processor 1550, the main memory 1554, the static memory 1556, or the mass storage device 1551 may constitute the machine-readable medium 1552.

While the machine-readable medium 1552 is illustrated as a single medium, the term "machine-readable medium" may include a single medium or multiple media (e.g., a centralized or distributed database, or associated caches and servers) configured to store the one or more instructions 1555. The term "machine-readable medium" may include any medium that is capable of storing, encoding, or carrying instructions for execution by the machine 1500 and that cause the machine 1500 to perform any one or more of the techniques to which the machine 1500 is designed, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

The instructions 1555 (e.g., software, programs, an operating system (OS), etc.) or other data are stored on the mass storage device 1551, can be accessed by the main memory 1554 for use by the processor 1550. The main memory 1554 (e.g., DRAM) is typically fast, but volatile, and thus a different type of storage than the mass storage device 1551 (e.g., an SSD), which is suitable for long-term storage, including while in an "off" condition. The instructions 1555 or data in use by a user or the machine 1500 are typically loaded in the main memory 1554 for use by the processor 1550. When the main memory 1554 is full, virtual space from the mass storage device 1551 can be allocated to supplement the main memory 1554; however, because the mass storage device 1551 is typically slower than the main memory 1554, and write speeds are typically at least twice as slow as read speeds, use of virtual memory can greatly reduce user experience due to storage device latency (in contrast to the main memory 1554, e.g., DRAM). Further, use of the mass storage device 1551 for virtual memory can greatly reduce the usable lifespan of the mass storage device 1551.

In contrast to virtual memory, virtual memory compression (e.g., the Linux® kernel feature "ZRAM") uses part of the memory as compressed block storage to avoid paging to the mass storage device 1551. Paging takes place in the compressed block until it is necessary to write such data to the mass storage device 1551. Virtual memory compression increases the usable size of main memory 1554, while reducing wear on the mass storage device 1551.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, embedded multi-media controller (eMMC™) devices are attached to a circuit board and considered a component of the host device, with read speeds that rival serial advanced technology attachment (SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1555 may further be transmitted or received over a communications network 1559 using a transmission medium via the network interface device 1553 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 1553 may include one or more physical jacks (e.g., Ethernet, coaxial, or phone jacks) or one or more antennas to connect to the communications network 1559. In an example, the network interface device 1553 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of carrying instructions to and for execution by the machine 1500, and includes instrumentalities to propagate digital or analog communications signals to facilitate communication of such instructions, which instructions may be implemented by software.

The following are example embodiments of devices and methods, in accordance with the teachings herein.

An example memory device 1 can comprise: a memory die including: a memory array; a cache to hold data in a data path to or from the memory array; and a controller including processing circuitry including one or more processors, the controller configured to perform operations, the operations including: controlling a power budget for the cache and the memory array by using a first flag received from a data path identifying start of a cache operation on the data and a second flag received from the data path identifying an end of the cache operation.

An example memory device 2 can include features of example memory device 1 and can include the cache being a page buffer of the memory die for a write cache operation, with the first flag being a signal from deserializer circuitry of the memory die and the second flag being a signal from the page buffer.

An example memory device 3 can include features of any of the preceding example memory devices and can include the cache being a sense amplifier of the memory die for a read cache operation, with the first flag being a signal from the sense amplifier and the second flag being a signal from serializer circuitry of the memory die.

An example memory device 4 can include features of any of the preceding example memory devices and can include the controller being coupled to timing logic of the memory die to receive a signal to monitor the cache operation.

An example memory device 5 can include features of example memory device 4 and any of the preceding example memory devices and can include the memory die including a lookup table accessible to determine, using the signal from the timing logic, current to be consumed during a write operation or a read operation associated with the cache operation.

An example memory device 6 can include features of any of the preceding example memory devices and can include the operations comprising: determining availability of the power budget of a next cache operation; and in response to a determination that the power budget is insufficient for the next cache operation, adjusting operation of the memory array to release an amount of peak power budget for the cache operation.

An example memory device 7 can include features of any of the preceding example memory devices and can include the controller being settable as a control manager to controllers of a set of managed memory dies to allow a selected die of the set to operate during an individual cache operation, while allowing the other dies of the set to stall with respect to respective cache and memory array operations.

An example memory device 8 can include features of any of the preceding example memory devices and can include the operations comprising: monitoring operations of the memory array and the cache; and calculating total peak power used by the memory array and the cache.

An example memory device 9 can include features of example memory device 8 and any of the preceding example memory devices and can include the controller being operable to communicate the calculated total peak power of the memory device to controllers of other memory die arranged in a peak power management group with the memory device.

An example memory device 10 can include features of any of the preceding example memory devices and can include the controller including a filter to smooth out pauses in data transfer with respect to a current budget for the cache and the memory array to control the current budget.

An example memory device 11 can include features of example memory device 10 and any of the preceding example memory devices and can include the filter including a timer to release a cache operation budget in response to the timer reaching a filter time without a new cache operation occurring.

An example memory device 12 can include features of any of the preceding example memory devices and can include the controller being operable to feedback a signal to a memory controller to adjust an operating speed of an interface from the memory controller to the memory die.

In an example memory device 13, any of the memory devices of example memory devices 1 to 12 may include memory devices incorporated into an electronic memory apparatus further comprising a host processor and a communication bus extending between the host processor and the memory device.

In an example memory device 14, any of the memory devices of example memory devices 1 to 13 may be modified to include any structure presented in another of example memory device 1 to 13.

In an example memory device 15, any apparatus associated with the memory devices of example memory devices 1 to 14 may further include a machine-readable storage device configured to store instructions as a physical state, wherein the instructions may be used to perform one or more operations of the apparatus.

In an example memory device 16, any of the memory devices of example memory devices 1 to 15 may be operated in accordance with any of the methods of the below example methods 1 to 5.

An example memory device 17 can comprise: an input node to receive a supply voltage; and multiple memory dies coupled to the input node, forming a peak power management group, with each memory die of the multiple memory dies including: a memory array; a cache to hold data in a data path to or from the memory array; a controller including processing circuitry including one or more processors, the controller configured to perform operations, the operations including: controlling a power budget for the cache and the memory array by using a first flag received from a data path identifying start of a cache operation on the data and a second flag received from the data path identifying an end of the cache operation; and a connection to output data regarding the power budget to one or more other memory dies of the peak power management group.

An example memory device 18 can include features of example memory device 17 and can include the controller being operable to feedback a signal to a memory controller or interface controller to the multiple memory dies to adjust an operating speed of an interface to the memory dies.

An example memory device 19 can include features of example memory device 18 and features of example memory device 17 and can include the signal being a toggle signal, or an analog signal generated from turning off or on different paths in the memory die.

An example memory device 20 can include features of any of the preceding example memory devices 17 to 19 and can include the cache being a page buffer of the memory die for a write cache operation, with the first flag being a signal from deserializer circuitry of the memory die and the second flag being a signal from the page buffer.

An example memory device 21 can include features of any of the preceding example memory devices 17 to 20 and can include the cache being a sense amplifier of the memory die for a read cache operation, with the first flag being a signal from the sense amplifier and the second flag being a signal from serializer circuitry of the memory die.

An example memory device 22 can include features of any of the preceding example memory devices 17 to 21 and can include the controller being coupled to timing logic of the memory die to receive a signal to monitor the cache operation.

An example memory device 23 can include features of any of the preceding example memory devices 17 to 22 and can include each memory die including a lookup table accessible to determine, using the signal from the timing logic of the memory die, current to be consumed during a write operation or a read operation associated with the cache operation.

An example memory device 24 can include features of any of the preceding example memory devices 17 to 23 and can include one of the memory dies being set as a manager to the one or more other memory dies of the multiple memory dies, with respect to operation as part of the peak power management group.

In an example memory device 25, any of the memory devices of example memory devices 17 to 24 may include memory devices incorporated into an electronic memory apparatus further comprising a host processor and a communication bus extending between the host processor and the memory device.

In an example memory device 26, any of the memory devices of example memory devices 17 to 25 may be modified to include any structure presented in another of example memory device 17 to 25.

In an example memory device 27, any of apparatus associated with the memory devices of example memory devices 17 to 26 may further include a machine-readable storage device configured to store instructions as a physical state, wherein the instructions may be used to perform one or more operations of the apparatus.

In an example memory device 28, any of the memory devices of example memory devices 17 to 27 may be operated in accordance with any of the methods of the following example methods 1 to 5.

An example memory device 29 can include features of any of the preceding example memory devices 1-28.

An example method 1 of controlling peak power management in a memory device can comprise: monitoring a data path to or from a memory array of a memory die, the data path including a cache to hold data; using a first flag received, at logic circuitry of the memory die, from the data path to identify start of a cache operation on the data; using a second flag received, at the logic circuitry of the memory die, from the data path to identify an end of the cache operation; and controlling, in the logic circuitry of the memory die, a power budget for the cache and the memory array using the start and end of the cache operation.

An example method 2 of controlling peak power management in a memory device can include features of example method 1 of controlling peak power management in a memory device and can include receiving, at the logic circuitry of the memory die, a signal from timing logic of the memory die to monitor the cache operation; accessing information in a lookup table in the memory die, the information including programmed timing modes of current or operational speed of the data path; and determining, in the logic circuitry of the memory die using the signal from the timing logic and the information, current to be consumed during a write operation or a read operation associated with the cache operation.

An example method 3 of controlling peak power management in a memory device can include features of any of the preceding example methods of controlling peak power management in a memory device and can include calculating, in the logic circuitry of the memory die, a total peak power used by the memory array and the cache; and communicating the calculated total peak power to another memory die arranged in a peak power management group with the memory die.

An example method 4 of controlling peak power management in a memory device can include features of any of the preceding example methods of controlling peak power management in a memory device and can include controlling the power budget for the cache and the memory array includes using a filter to smooth out pauses in data transfer with respect to the current budget for the cache and the memory.

An example method 5 of controlling peak power management in a memory device can include features of example method 4 of controlling peak power management in a memory device and any of the preceding example methods of controlling peak power management in a memory device and can include feeding back a signal to a memory controller coupled to the memory die by an interface to adjust an operating speed of the interface.

In an example method 6 of controlling peak power management in a memory device, any of the example methods 1 to 5 of controlling peak power management in a memory device may be performed in an electronic memory apparatus further comprising a host processor and a communication bus extending between the host processor and the memory device.

In an example method 7 of controlling peak power management in a memory device, any of the example methods 1 to 6 of controlling peak power management in a memory device may be modified to include operations set forth in any other of method examples 1 to 6 of controlling peak power management in a memory device.

In an example method 8 of controlling peak power management in a memory device, any of the example methods 1 to 9 of controlling peak power management in a memory device may be implemented at least in part through use of instructions stored as a physical state in one or more machine-readable storage devices.

An example method 9 of controlling peak power management in a memory device can include features of any of the preceding example methods 1 to 10 of controlling peak power management in a memory device and can include performing functions associated with any features of example memory devices 1 to 29.

An example machine-readable storage device 1 storing instructions, that when executed by one or more processors, cause a machine to perform operations, can comprise instructions to perform functions associated with any features of example memory devices 1 to 16 and memory devices 17 to 29 or perform methods associated with any features of example methods 1 to 9.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. The above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. Combinations of the above embodiments and other embodiments will be apparent to those of skill in the art upon studying the above description.

What is claimed is:

1. A memory device comprising:
   a memory die including:
   a memory array;
   a cache to hold data in a data path to or from the memory array; and
   a controller including processing circuitry including one or more processors, the controller configured to perform operations, the operations including:
   controlling a power budget for the cache and the memory array by using a first flag received from a data path identifying start of a cache operation on the data and a second flag received from the data path identifying an end of the cache operation.

2. The memory device of claim 1, wherein the cache is a page buffer of the memory die for a write cache operation, with the first flag being a signal from deserializer circuitry of the memory die and the second flag being a signal from the page buffer.

3. The memory device of claim 1, wherein the cache is a sense amplifier of the memory die for a read cache operation, with the first flag being a signal from the sense amplifier and the second flag being a signal from serializer circuitry of the memory die.

4. The memory device of claim 1, wherein the controller is coupled to timing logic of the memory die to receive a signal to monitor the cache operation.

5. The memory device of claim 4, wherein the memory die includes a lookup table accessible to determine, using the signal from the timing logic, current to be consumed during a write operation or a read operation associated with the cache operation.

6. The memory device of claim 1, wherein the operations comprise:
   determining availability of the power budget of a next cache operation; and
   in response to a determination that the power budget is insufficient for the next cache operation, adjusting operation of the memory array to release an amount of peak power budget for the cache operation.

7. The memory device of claim 1, wherein the controller is settable as a control manager to controllers of a set of managed memory dies to allow a selected die of the set to operate during an individual cache operation, while allowing the other dies of the set to stall with respect to respective cache and memory array operations.

8. The memory device of claim 1, wherein the operations comprise:
   monitoring operations of the memory array and the cache; and
   calculating total peak power used by the memory array and the cache.

9. The memory device of claim 8, wherein the controller is operable to communicate the calculated total peak power of the memory device to controllers of other memory die arranged in a peak power management group with the memory device.

10. The memory device of claim 1, wherein the controller includes a filter to smooth out pauses in data transfer with respect to a current budget for the cache and the memory array to control the current budget.

11. The memory device of claim 10, wherein the filter includes a timer to release a cache operation budget in response to the timer reaching a filter time without a new cache operation occurring.

12. The memory device of claim 1, wherein the controller is operable to feedback a signal to a memory controller to adjust an operating speed of an interface from the memory controller to the memory die.

13. A memory device comprising:
   an input node to receive a supply voltage; and
   multiple memory dies coupled to the input node, forming a peak power management group, with each memory die of the multiple memory dies including:
   a memory array;
   a cache to hold data in a data path to or from the memory array;

a controller including processing circuitry including one or more processors, the controller configured to perform operations, the operations including:
controlling a power budget for the cache and the memory array by using a first flag received from a data path identifying start of a cache operation on the data and a second flag received from the data path identifying an end of the cache operation; and
a connection to output data regarding the power budget to one or more other memory dies of the peak power management group.

14. The memory device of claim 13, wherein the controller is operable to feedback a signal to a memory controller or interface controller to the multiple memory dies to adjust an operating speed of an interface to the memory dies.

15. The memory device of claim 14, wherein the signal is a toggle signal, or an analog signal generated from turning off or on different paths in the memory die.

16. The memory device of claim 13, wherein the cache is a page buffer of the memory die for a write cache operation, with the first flag being a signal from deserializer circuitry of the memory die and the second flag being a signal from the page buffer.

17. The memory device of claim 13, wherein the cache is a sense amplifier of the memory die for a read cache operation, with the first flag being a signal from the sense amplifier and the second flag being a signal from serializer circuitry of the memory die.

18. The memory device of claim 13, wherein the controller is coupled to timing logic of the memory die to receive a signal to monitor the cache operation.

19. The memory device of claim 18, wherein each memory die includes a lookup table accessible to determine, using the signal from the timing logic of the memory die, current to be consumed during a write operation or a read operation associated with the cache operation.

20. The memory device of claim 13, wherein one of the memory dies is set as a manager to the one or more other memory dies of the multiple memory dies, with respect to operation as part of the peak power management group.

21. A method of controlling peak power management in a memory device, the method comprising:
monitoring a data path to or from a memory array of a memory die, the data path including a cache to hold data;
using a rust flag received, at logic circuitry of the memory die, from the data path to identify start of a cache operation on the data;
using a second flag received, at the logic circuitry of the memory die, from the data path to identify an end of the cache operation; and
controlling, in the logic circuitry of the memory die, a power budget for the cache and the memory array using the start and end of the cache operation.

22. The method of claim 21, wherein the method includes:
receiving, at the logic circuitry of the memory die, a signal from timing logic of the memory die to monitor the cache operation;
accessing information in a lookup table in the memory die, the information including programmed timing modes of current or operational speed of the data path; and
determining, in the logic circuitry of the memory die using the signal from the timing logic and the information, current to be consumed during a write operation or a read operation associated with the cache operation.

23. The method of claim 21, wherein the method includes:
calculating, in the logic circuitry of the memory die, a total peak power used by the memory array and the cache; and
communicating the calculated total peak power to another memory die arranged in a peak power management group with the memory die.

24. The method of claim 21, wherein controlling the power budget for the cache and the memory array includes using a filter to smooth out pauses in data transfer with respect to the current budget for the cache and the memory.

25. The method of claim 21, wherein the method includes feeding back a signal to a memory controller coupled to the memory die by an interface to adjust an operating speed of the interface.

* * * * *